United States Patent
Kaizer et al.

(10) Patent No.: US 11,632,236 B1
(45) Date of Patent: Apr. 18, 2023

(54) ESTABLISHMENT, MANAGEMENT, AND USAGE OF DOMAIN NAME TO BLOCKCHAIN ADDRESS ASSOCIATIONS

(71) Applicant: VERISIGN, INC., Reston, VA (US)

(72) Inventors: Andrew Kaizer, Arlington, VA (US); Swapneel Sheth, Fairfax, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 16/402,047

(22) Filed: May 2, 2019

Related U.S. Application Data

(63) Continuation-in-part of application No. 16/024,488, filed on Jun. 29, 2018, now Pat. No. 10,721,060.

(51) Int. Cl.
| | |
|---|---|
| *H04L 29/06* | (2006.01) |
| *H04L 9/06* | (2006.01) |
| *H04L 9/08* | (2006.01) |
| *G06F 16/23* | (2019.01) |
| *H04L 61/4511* | (2022.01) |
| *H04L 9/00* | (2022.01) |

(52) U.S. Cl.
CPC ........ *H04L 9/0637* (2013.01); *G06F 16/2379* (2019.01); *H04L 9/0825* (2013.01); *H04L 61/4511* (2022.05); *H04L 9/50* (2022.05)

(58) Field of Classification Search
CPC . H04L 9/0637; H04L 9/0825; H04L 61/1511; H04L 2209/38; G06F 16/2379
See application file for complete search history.

(56) References Cited

U.S. PATENT DOCUMENTS

| | | | | |
|---|---|---|---|---|
| 10,721,060 | B1* | 7/2020 | Kaizer | H04L 61/1511 |
| 11,392,579 | B2* | 7/2022 | Kasimov | H04L 61/4511 |
| 2011/0296440 | A1 | 12/2011 | Launch et al. | |
| 2012/0011360 | A1 | 1/2012 | Engels et al. | |
| 2015/0278820 | A1 | 10/2015 | Meadows | |
| 2016/0196300 | A1 | 7/2016 | Kamdar et al. | |
| 2016/0292672 | A1 | 10/2016 | Fay et al. | |
| 2017/0180134 | A1* | 6/2017 | King | H04L 63/0853 |

(Continued)

FOREIGN PATENT DOCUMENTS

WO    2018007828 A2    1/2018

OTHER PUBLICATIONS

International Search Report and Written Opinion issued in International Application No. PCT/US2019/038447 dated Sep. 30, 2019, pp. 1-15.

(Continued)

*Primary Examiner* — Shin-Hon (Eric) Chen
(74) *Attorney, Agent, or Firm* — McCarter & English, LLP; Michael A. Sartori

(57) ABSTRACT

Systems, methods, and computer-readable media for providing a computer associated with a blockchain to utilize DNS-stored blockchain address information concerning associations of domain names to blockchain addresses are presented. Some embodiments include: receiving a domain name; retrieving over the internet a Domain Name System (DNS) resource record for the domain name; extracting blockchain address information associated with the domain name from the DNS resource record, where the blockchain address information is signed by a private key of an asymmetric cryptographic scheme; and initiating a blockchain action based on the blockchain address information.

17 Claims, 17 Drawing Sheets

(56) References Cited

U.S. PATENT DOCUMENTS

| | | | |
|---|---|---|---|
| 2017/0310484 | A1 | 10/2017 | Kaliski, Jr. et al. |
| 2017/0324738 | A1* | 11/2017 | Hari ................. H04W 12/1008 |
| 2017/0330174 | A1* | 11/2017 | Demarinis .............. G06F 21/62 |
| 2017/0344988 | A1* | 11/2017 | Cusden .................. G06F 21/00 |
| 2017/0346833 | A1* | 11/2017 | Zhang .................. H04L 63/123 |
| 2018/0227275 | A1* | 8/2018 | Russinovich ......... H04L 9/3265 |
| 2018/0262493 | A1* | 9/2018 | Andrade ................ G06F 21/31 |
| 2018/0287997 | A1 | 10/2018 | Li et al. |
| 2019/0121988 | A1* | 4/2019 | van de Ruit ........... G06Q 20/36 |
| 2019/0156040 | A1 | 5/2019 | Sasin et al. |
| 2019/0166085 | A1* | 5/2019 | Li ...................... H04L 61/1511 |
| 2019/0220831 | A1 | 7/2019 | Rangarajan |
| 2019/0253252 | A1 | 8/2019 | Qiu |
| 2019/0333054 | A1 | 10/2019 | Cona et al. |
| 2020/0021446 | A1* | 1/2020 | Roennow ............ H04L 63/0478 |
| 2020/0145373 | A1* | 5/2020 | Richardson ............ G06Q 10/10 |
| 2020/0314055 | A1 | 10/2020 | Blinn |
| 2020/0328883 | A1 | 10/2020 | Kaizer et al. |
| 2021/0037013 | A1* | 2/2021 | Salkintzis ............... H04L 63/06 |
| 2021/0135867 | A1 | 5/2021 | Zeng et al. |

OTHER PUBLICATIONS

Domraider, "ICO Whitepaper," www.domraider.io, SIRET 79417114000013 [retrieved on Aug. 25, 2019], Retrieved from the Internet: URL:https://s3-eu-west-1.amazonaws.com/domraider/domraider/DomRaider+ICO+Whitepaper+EN.pdf pp. 1-127.

Johnson, N., "How to claim your DNS domain on ENS," The Ethereum Name Service, Nov. 11, 2017, https://medium.com/the-ethereum-name-service/how-to-claim-your-dns-domain-on-ens-e600ef2d92ca, accessed Jun. 29, 2018, pp. 1-4.

Moosavi, "Rethinking Certificate Authorities: Understanding and Decentralizing Domain Validation," Concordia Institute for Information Systems Engineering, Montreal, Quebec, Canada, Apr. 2, 2018, [retrieved on Aug. 25, 2019], Retrieved from the Internet: URL:https://pdfs.semanticscholar.org/7e38/b0c0e6f7066de9821b8fab6a489a 79907 44f.pdf pp. 1-92.

Tarasov, P. "Internet Voting Using Zcash," University of Dublin, Trinity College, May 2017 [retrieved on Aug. 25, 2019]. Retrieved from the Internet: URL:https://scss.tcd .ie/publications/theses/diss/20 17/TCD-SCSS-DISSERTA TION-2017-015.pdf pp. 1-89.

International Preliminary Reporton Patentability issued in International Application No. PCT/US2019/038447 dated Jan. 7, 2021, pp. 1-13.

Notice of Allowance issued in U.S. Appl. No. 16/024,488 dated Mar. 13, 2020, 30 pages.

Office Action issued in U.S. Appl. No. 16/515,825 dated Apr. 15, 2021, 14 pages.

Office Action issued in U.S. Appl. No. 16/515,825 dated Sep. 20, 2021, 19 pages.

Baritz et al., ID4me—Technical White Paper Draft, Version 14, Feb. 28, 2020, 39 pages.

Bertola, V., ID4me, Technical overview, Version 1.4, Oct. 4, 2019, 16 pages.

Bertola, V., ID4me, General Overview, Version 1.3, Oct. 6, 2019, 5 pages.

Dan.com, "Domain Industry, Let us Innovate.", Retrieved from the Internet: https://blog.undeveloped.com/domain-industry-join-us-in-becoming-innovative-thriving-again-a751d2e17ae9, Nov. 21, 2017 [retrieved on Sep. 17, 2021], pp. 1-6.

DNS Registrar guide—Ethereum Name Service, Retrieved from the Internet on Sep. 22, 2021: https://docs.ens.domains/dns-registrar-guide, pp. 1-5.

Einarrson, B., "[DNSOP] Verifying TLD operator authorisation," Retrieved from the Internet: https://mailarchive.ietf.org/arch/msg/dnsop/qaDjnArp98T0gIBYQbUfswwaxrg, Jun. 18, 2019 [retrieved on Sep. 17, 2021], 1 page.

Hollenbeck, S., "Extensible Provisioning Protocol (EPP) Domain Name Mapping," RFC 4931, Retrieved from the Internet: https://datatracker.ietf.org/doc/html/rfc4931. May 2007 [retrieved on Sep. 7, 2021], pp. 1-46.

Hollenbeck, S., "Extensible Provisioning Protocol (EPP)," RFC 5730, Retrieved from the Internet: https://datatracker.ietf.org/doc/html/rfc5730. Aug. 2009 [retrieved on Sep. 7, 2021], pp. 1-67.

Hollenbeck et al., "Security Services for the Registration Data Access Protocal (RDAP)," RFC 7481, Retrieved from the Internet: https://tools.ietf.org/html/rfc7481, Mar. 2015 [retrieved on Sep. 7, 2021], pp. 1-13.

Johnson, N., "[DNSOP] Verifying TLD operator authorisation," Retrieved from the Internet: https://mailarchive.ietf.org/arch/msg/dnsop/AX5D3cqSTWF69pAWqu5Pn6SGXDs, Jun. 14, 2019 [retrieved on Sep. 17, 2021], 1 page.

Johnson, N., "ENS Root Change Will Allow Easy Integration of More Than 1300 DNS TLDs," Retrieved from the Internet: https://medium.com/the-ethereum-name-service/upcoming-changes-to-the-ens-root-a1b78fd52b38, Feb. 25, 2019 [retrieved on Sep. 7, 2021], 4 pages.

Johnson, N., "Introducing .luxe on ENS," Retrieved from the Internet: https://medium.com/@weka/introducing-luxe-on-ens-35a9ee2383ce, Oct. 2, 2018 [retrieved on Sep. 7, 2021], 4 pages.

Kuhl, R., "[DNSOP] Verifying TLD operator authorisation," Retrieved from the Internet: https://mailarchive.ietf.org/arch/msg/dnsop/DQEjRQzAafeGoMckNTt5GxSTe9g, Jun. 14, 2019 [retrieved on Sep. 17, 2021], 1 page.

Millegan, B., "ENS + .KRED: Major Integration of DNS and ENS Launches," Retrieved from the Internet: https://medium.com/the-ethereum-name-service/ens-kred-major-integration-of-dns-and-ens-launches-e7efb4dd872a, Feb. 19, 2020 [retrieved on Sep. 7, 2021], 3 pages.

Millegan, B., "Ethereum Name Service," Retrieved from the Internet on Sep. 7, 2021: https://vir.isi.edu/events/dinr2020/S/blantly-ENS.pdf, 24 pages.

Millegan, B., "Linking DNS with blockchain-based ENS records," Retrieved from the Internet on Sep. 7, 2021 https://censo-icann.org/sites/default/files/field-attached/presentation-dns-blockchain-ens-24jun19-en.pdf, 31 pages.

Monster, R., "Domain Leasing : How we do it at Epik, and how you can too!," Retrieved from the Internet: https://www.epik.com/blog/leasing-domains-how-we-do-it-at-epik-and-how-you-can-too.html, Mar. 27, 2020 [retrieved on Sep. 7, 2021], 14 pages.

Verisign, Inc., "Ethereum Name Service (ENS) Root Change Issues," Verisign Technical Note, Retrieved from the Internet on Sep. 22, 2021: https://www.verisign.com/assets/labs/ens-root-change-issues-5.2020.pdf, pp. 1-2.

\* cited by examiner

Select Domain to Push Blockchain Claims For:

| Domain | Blockchain | Address | Status | Remove ? |
|---|---|---|---|---|
| name.ltd | Blockchain1 | 0xf17f52151ebef6c7334 | On Chain | ☐ Remove? |
| name.ltd | Blockchain1 | 0x135f7911ae96409889cb | On Chain | ☐ Remove? |
| name.ltd/personal | Blockchain1 | 0x375f7911ae5ae09879c3 | | Remove Added Row |
| name.ltd/business | Select... | Blockchain address | | Remove Added Row | name.ltd (1302)

1304 — name.ltd/business
1306 — Blockchain column
1308 — Address column
1310 — Status column
1312 — Remove column

[Add Blockchain Mapping] 1314  [Submit] 1316

ESTABLISHMENT, MANAGEMENT, AND USAGE OF DOMAIN NAME TO BLOCKCHAIN ADDRESS ASSOCIATIONS

RELATED APPLICATION

This application claims priority to, and the benefit of, as a continuation-in-part, U.S. Patent application Ser. No. 16/024,488, entitled, "DOMAIN NAME BLOCKCHAIN USER ADDRESSES", and filed on Jun. 29, 2018, which is incorporated by reference in its entirety.

FIELD

This disclosure relates generally to blockchains, and, more particularly, blockchain addresses.

BACKGROUND

The domain name system (DNS) is a hierarchical distributed naming system for resources provided by computer servers that are connected to the internet. It associates domain names to numeric internet protocol (IP) addresses of internet resources. The DNS thus allows computers and humans to access networked resources, including web pages, using domain names.

As used herein, unless otherwise qualified by specifying the level, the term "domain name" means fully qualified domain name, including a top-level domain name, a second-level domain name, and possibly additional levels of domain names.

A DNS "registry" is an authoritative, master database of all domain names registered in a top-level domain or other domain in which domain names can be registered. A registry includes many hardware computer servers operably coupled to the internet. For ease of discussion, a registry is identified with its hardware computer servers unless otherwise specified or clear from context. Internet users generally interact with the registry via intermediaries such as registrars.

"Registrars" are companies that register registrations of domain names by entities known as "registrants". Registrars compete with one another to register domain names for registrants through the registry. That is, an internet user interacts with a registrar to obtain registration of a domain name, thereby becoming a registrant for the domain. Registrars typically include many hardware computer servers. For ease of discussion, a registrar is identified with its hardware computer servers unless otherwise specified or clear from context. Further, for ease of discussion, a registrant is identified with its hardware client computer unless otherwise specified or clear from context.

Trusted "service providers" provide DNS-related services but are not DNS registrars or DNS registries. For example, web hosting providers provide the web server computers that serve the web pages associated with domain names. These entities are trusted service providers in the DNS context. As another example, consumer DNS resolvers provide DNS resolution services separate from the official distributed database of DNS data maintained by the official DNS registries. Such DNS operators are also a type of trusted service provider. As yet another example, trusted service providers in the DNS context may act on a user's behalf, e.g., to enable DNSSEC for a registrant's domain. Other trusted service providers exist.

A cryptographic hash (or simply "hash" or "fingerprint") is a function that can input any of a variety of computer-interpretable objects and output a fixed-size string, e.g., a hexadecimal number. Cryptographic hashes typically have other useful properties such as preimage resistance (or "irreversibility") and collision resistance.

"Asymmetric cryptography" generally refers to cryptography that utilizes an asymmetric "key pair" consisting of a "public key" and a "private key". A message or other data may be encrypted by applying an encryption algorithm under control of the public key, and an encrypted message or other data may be decrypted by applying a conjugate decryption algorithm and under control of the private key to the encrypted message. Asymmetric cryptography includes well-known asymmetric cryptographic schemes, such as the Rivest-Shamir-Adleman (RSA) technique, as well as the Diffie-Hellman family of techniques.

A conventional digital signature, or simply "signature", is the result of applying a private key of an asymmetric cryptographic key pair to encrypt a computer-interpretable object. The corresponding public key is published or otherwise made available by the signing entity to the verifying party. The object may first be hashed as part of the signature process. A verifying party can verify the signature by applying the public key to decrypt the signature and comparing the result to the object or the hash of the object, or otherwise by determining that the signature corresponds to the object or its hash, depending on the scheme. If the comparison results in a match, then the signature is valid; otherwise it is invalid. Digital signatures typically confer authentication (i.e., binding the signed object to the signer), non-repudiation (i.e., assuring that the signed object was indeed signed by the signing entity), and object integrity (i.e., assuring that the signed object has not changed since being signed). The process of "validating" a signature confirms that the aforementioned properties hold for the signed object. An asymmetric key pair that supports digital signatures may or may not also support encryption and decryption operations.

A digital certificate, or simply "certificate", is a package that includes information identifying a public key (e.g., the key itself or a hash of the key), together with information identifying the owner of the key, and a digital signature on at least some of the package contents. Certificates typically have expiration dates, which may be represented in the package contents. The digital certificate is produced (i.e., signed) by a trusted party, such as a certification authority. A digital certificate provides any entity that trusts the party that signed the certificate with the ability to validate that the signed public key is indeed associated with the party identified in the certificate. Thus, certificates are used to protect data, encrypt transactions, and enable secure communications, among other uses. An example standard for certificates is the X.509 standard, promulgated by the International Telecommunications Union's Standardization sector.

A "certification authority" is an entity that provides digital certificates. Thus, certificate authorities are trusted third parties, which verify the identities of parties engaged in some communication. Certificate authorities may issue many certificates per minute. Certification authorities are identified with the computer servers that provide the certificates.

A "blockchain" is a decentralized, distributed, electronic ledger that records transactions, including but not limited to cryptocurrency transactions, or other information, as described presently. In general, a blockchain takes the form of a distributed readable and writeable computer interpretable data structure, stored in various computers (i.e., nodes) in the blockchain network (e.g., a cryptocurrency network). A blockchain is constructed from individual logical blocks.

Each block may include any, or a combination, of: a timestamp representing a time of the block's creation, a cryptographic hash of an identification of the previous block, and a payload, which includes data that may represent transactions or other information. The data in the blockchain payload may represent, for example, for each of a plurality of transactions, a transaction identifier, a transaction amount, and the address associated with the receiving party (more precisely, associated with the receiving party's public key). Each participant in the blockchain network is associated with a cryptographic asymmetric key pair, referred to as the participant's "blockchain key pair", consisting of a public key (e.g., usable by the participant to receive cryptocurrency) and a private key (e.g., usable by the participant to send cryptocurrency). In particular, the public key is associated with (e.g., usable to derive via cryptographic hash) a "blockchain address" of the participant, and the private key is owned or controlled—and kept secret—by the blockchain network participant. A first blockchain participant may receive cryptocurrency from a second blockchain participant, for example, that utilizes a cryptocurrency blockchain address of the first blockchain participant. For brevity, blockchain addresses are referred to as "addresses" herein when clear from context.

SUMMARY

Part A Summary

According to various embodiments, a domain name system (DNS) registry facilitated method of assigning a DNS domain name registered to a registrant as a blockchain address in a blockchain network is presented. The method includes: obtaining, by the DNS registry for the domain name, a cryptographic asymmetric proof key pair including a public key and a private key; providing, by the DNS registry, the public key and a computer executable registry signature verification program for addition to a block in a blockchain of the blockchain network, where the registry signature verification program is configured to use the public key to validate signatures made using the private key; receiving, by the DNS registry, a request for a proof of registrar of record for the domain name from a registrar of record for the domain name, where the request includes the domain name; confirming, by the DNS registry, that the registrar is a registrar of record for the domain name; providing, by the DNS registry, a proof of registration message, where the proof of registration message includes a signature by the private key and confirms that the registrar is a registrar of record for the domain name; such that the registry signature verification program validates the signature using the public key, and such that the blockchain network receives and stores in the blockchain an association between the domain name and an existing blockchain address for the registrant.

Various optional features of the above method embodiments include the following. The method may further include: using the private key, signing, by the DNS registry, a top level domain name corresponding to the domain name and a blockchain address of the registry signature verification program to form a message; and providing the message to the blockchain network for inclusion in the blockchain. The providing, by the DNS registry, the proof of registration message may include providing, by the DNS registry, the domain name, the existing blockchain address for the registrant, and the proof of registration message to the blockchain network for processing by the registry signature verification program. The request may further include the existing blockchain address for the registrant. The registry signature verification program may be further configured to await confirmation sent from an electronic wallet of the registrant before requesting assignment of the domain name as a blockchain address of the registrant in the blockchain network. The method may further include: storing in persistent memory a voiceprint of a contact for a registration of the domain name; receiving a request to verify a new voiceprint; verifying the new voiceprint by matching to the voiceprint of the contact for the registration of the domain name; and providing a voiceprint verification to the registrar.

According to various embodiments, a domain name system (DNS) registrar facilitated method of assigning a DNS domain name registered to a registrant as a blockchain address in a blockchain network is presented. The method includes sending, by a DNS registrar for the domain name, and to a DNS registry for the domain name, a request for a proof of registrar of record for the domain name, where the request includes the domain name; receiving, by the DNS registrar, and from the DNS registry, a proof of registration message, where the proof of registration message includes a signature by a private key of the registry and confirms that the DNS registrar is a registrar of record for the domain name; and sending, by the DNS registrar, and to the blockchain network, a request to assign the domain name as a blockchain address for the registrant, such that a node in the blockchain network validates the signature using a private key corresponding to the public key and stores an association between the domain name and an existing blockchain address for the registrant.

Various optional features of the above method embodiments include the following. The method may include, prior to the sending the request for a proof of registrar of record for the domain name: receiving, by the DNS registrar for the domain name, a request for an access token, where the request includes a browser redirection from a service provider from which the registrant has requested that the domain name be assigned as a blockchain address of the registrant in the blockchain network; authenticating, by the DNS registrar, the registrant; responding to the request, by the DNS registrar, with an access token and a redirection back to the service provider; and receiving, by the DNS registrar, the access token, the domain name, and an existing blockchain address for the registrant. The request may further include the existing blockchain address for the registrant. The sending, by the DNS registrar, and to the blockchain network, the request to assign the domain name as a blockchain address for the registrant, may further include sending the request to a node in the blockchain network that includes a computer executable registry signature verification program configured to validate registry signatures and receive an authorization message originated by an electronic wallet of the registrant prior to it sending a request to assign the domain name as a blockchain address for the registrant in the blockchain network. The method may further include, prior to the sending the request for a proof of registrar of record for the domain name, receiving, by the DNS registrar, and from the registrant, a request to assign the domain name as a blockchain address of the registrant in the blockchain network. The request to assign the domain name as a blockchain address of the registrant in the blockchain network may be derived from an audio command provided by the registrant.

According to various embodiments, a domain name system (DNS) registry system configured to assign a DNS domain name registered to a registrant as a blockchain address in a blockchain network is presented. The system includes at least one electronic server computer communicatively coupled to the internet and to an electronic persistent storage device, the electronic persistent storage device storing a cryptographic asymmetric proof key pair including a public key and a private key, the at least one electronic server configured to provide the public key and a computer executable registry signature verification program to the blockchain network for addition to a block in a blockchain of the blockchain network, where the registry signature verification program is configured to use the public key to validate signatures made using the private key; and an Extensible Provisioning Protocol (EPP) interface communicatively coupled to the internet and the at least one electronic server computer and configured to respond to a request for a proof of registrar of record for the domain name, where the request includes the domain name, received from a registrar of record for the domain name, by confirming that the registrar is a registrar of record for the domain name and then providing a proof of registration message confirming that the registrar is a registrar of record for the domain name, where the proof of registration message includes a signature by the private key, such that the blockchain network receives and stores in the blockchain an association between the domain name and an existing blockchain address for the registrant after the registry signature verification program obtains and validates the signature using the public key.

Various optional features of the above embodiments include the following. The at least one electronic server computer may be further configured to sign, using the private key, a top level domain name corresponding to the domain name and a blockchain address of the registry signature verification program to form a message and provide the message to the blockchain network for inclusion in the blockchain. The EPP interface may be further configured to respond to the request for a proof of registrar of record for the domain name by confirming that the registrar is a registrar of record for the domain name and then providing the proof of registration message, the domain name, and the existing blockchain address for the registrant to the blockchain network for processing by the registry signature verification program. The request may further include the existing blockchain address for the registrant. The registry signature verification program may be further configured to await confirmation sent from an electronic wallet of the registrant before requesting assignment of the domain name as a blockchain address of the registrant in the blockchain network. The registry may be further configured to: store in persistent memory a voiceprint of a contact for a registration of the domain name; receive a request to verify a new voiceprint; verify the new voiceprint by matching to the voiceprint of the contact for the registration of the domain name; and provide a voiceprint verification to the registrar.

According to various embodiments, a domain name system (DNS) registrar system configured to assign a DNS domain name registered to a registrant by the registrar as a blockchain address in a blockchain network is presented. The DNS registrar system includes at least one electronic server computer communicatively coupled to the internet and configured to perform a method including: sending, to a DNS registry for the domain name, a request for a proof of registrar of record for the domain name, where the request includes the domain name; receiving, from the DNS registry, a proof of registration message confirming that the DNS registrar is a registrar of record for the domain name, where the proof of registration message includes a signature by a private key of the registry; and sending, to the blockchain network, a request to assign the domain name as a blockchain address for the registrant, such that a node in the blockchain network validates the signature using a private key corresponding to the public key and stores an association between the domain name and an existing blockchain address for the registrant.

Various optional features of the above system embodiments include the following. The at least one electronic server computer may be further configured to perform, prior to the sending the request for a proof of registrar of record for the domain name: receiving a request for an access token, where the request includes a browser redirection from a service provider from which the registrant has requested that the domain name be assigned as a blockchain address of the registrant in the blockchain network; authenticating the registrant; responding to the request with an access token and a redirection back to the service provider; and receiving, from the service provider, the access token, the domain name, and an existing blockchain address for the registrant. The request may further include the existing blockchain address for the registrant. The sending, to the blockchain network, the request to assign the domain name as a blockchain address for the registrant, may further include sending the request to a node in the blockchain network that includes a computer executable registry signature verification program configured to validate registry signatures and receive an authorization message originated by an electronic wallet of the registrant prior to it sending a request to assign the domain name as a blockchain address for the registrant in the blockchain network. The at least one electronic server computer may be further configured to perform, prior to the sending the request for a proof of registrar of record for the domain name, receiving, from the registrant, a request to assign the domain name as a blockchain address of the registrant in the blockchain network. The request to assign the domain name as a blockchain address of the registrant in the blockchain network may be derived from an audio command.

Part B Summary

According to various embodiments, a of method managing network identities associated with a domain name using a blockchain is presented. The method includes receiving, by a Domain Name System (DNS) registry, from a registrar for the domain name, and on behalf of a registrant of the domain name, a write request including a domain name, a network name, and a network identifier; and writing to the blockchain a mapping from the domain name to the network identifier; such that a computer hosting the blockchain provides the network identifier in response to receiving a read request including the domain name and the network name.

Various optional features of the above embodiments include the following. The method may include receiving, by the DNS registry, a request for format specifications; and providing, by the DNS registry, a list of format specifications for network identifiers for each of a plurality of networks. The method may include authorizing, by the DNS registry, at least one third party to write to the blockchain. The method may include writing to the blockchain a message including the network identifier, where the message is signed with a private key of an authoritative owner or operator of the network; such that a computer hosting the blockchain provides the message in response to receiving a proof of ownership request including the domain name and the network identifier. The writing to the blockchain may further include writing to the blockchain a time to live value for the mapping from the domain name to the network identifier. The method may include providing an Electronic Provisioning Protocol (EPP) interface; where the receiving the write request includes receiving the write request via the EPP interface. The method may include providing computer readable instructions that, when executed by an electronic computer, configure the electronic computer to host the blockchain as a node in a blockchain network. The method may include providing a script library, where the script library includes at least one command for reading selected data from the blockchain. The method may include receiving, by the DNS registry, from the registrar for the domain name, and on behalf of the registrant of the domain name, a second write request including the domain name and a second domain name; writing to the blockchain a mapping from the domain name to the second domain name; receiving, by the DNS registry, from the registrar for the second domain name, and on behalf of a registrant of the second domain name, a third write request including the second domain name, a second network name, and a second network identifier; and writing to the blockchain a mapping from the second domain name to the second network identifier; such that a computer hosting the blockchain provides at least the second network identifier in response to receiving the read request including the domain name and the second network name. The write request may further include access control information; and the writing to the blockchain a mapping from the domain name to the network identifier may further include writing to the blockchain a representation of the access control information.

According to various embodiments, a for managing network identities associated with a domain name using a blockchain is presented. The system includes a server computer communicatively coupled to the internet and configured to perform operations including: receiving, from a registrar for the domain name, and on behalf of a registrant of the domain name, a write request including a domain name, a network name, and a network identifier, the write request sent to a Domain Name System (DNS) registry; and writing to the blockchain a mapping from the domain name to the network identifier; such that a computer hosting the blockchain provides the network identifier in response to receiving a read request including the domain name and the network name.

Various optional features of the above embodiments include the following. The operations may further include: receiving, by the DNS registry, a request for format specifications; and providing, by the DNS registry, a list of format specifications for network identifiers for each of a plurality of networks. The operations may further include authorizing, by the DNS registry, at least one third party to write to the blockchain. The operations may further include writing to the blockchain a message including the network identifier, where the message is signed with a private key of an authoritative owner or operator of the network; such that a computer hosting the blockchain provides the message in response to receiving a proof of ownership request including the domain name and the network identifier. The writing to the blockchain may further include writing to the blockchain a time to live value for the mapping from the domain name to the network identifier. The system may further include an Electronic Provisioning Protocol (EPP) interface; where the receiving the write request includes receiving the write request via the EPP interface. The operations may further include providing computer readable instructions that, when executed by an electronic computer, configure the electronic computer to host the blockchain as a node in a blockchain network. The system may further include a script library, where the script library includes at least one command for reading selected data from the blockchain. The operations may further include: receiving, by the DNS registry, from the registrar for the domain name, and on behalf of the registrant of the domain name, a second write request including the domain name and a second domain name; writing to the blockchain a mapping from the domain name to the second domain name; receiving, by the DNS registry, from the registrar for the second domain name, and on behalf of a registrant of the second domain name, a third write request including the second domain name, a second network name, and a second network identifier; and writing to the blockchain a mapping from the second domain name to the second network identifier; such that a computer hosting the blockchain provides at least the second network identifier in response to receiving the read request including the domain name and the second network name. The write request may further include access control information; where the writing to the blockchain a mapping from the domain name to the network identifier further includes writing to the blockchain a representation of the access control information.

Part C Summary

According to various embodiments, a domain name system (DNS) registry facilitated method of assigning an identifier including a domain name registered to a registrant to a blockchain address for the registrant in a blockchain network is presented. The method includes obtaining, by the DNS registry for the domain name, a cryptographic asymmetric proof key pair including a public key and a private key; providing, by the DNS registry, the public key and a computer executable registry signature verification program for addition to a block in a blockchain of the blockchain network, where the registry signature verification program is configured to use the public key to validate signatures made using the private key; receiving, by the DNS registry, a request for a proof of registrar of record for the domain name from a registrar of record for the domain name, where the request includes the domain name; confirming, by the DNS registry, that the registrar is a registrar of record for the domain name; and providing, by the DNS registry, a proof of registration message, where the proof of registration message includes a signature by the private key and confirms that the registrar is a registrar of record for the domain name; such that the blockchain network receives the identifier, the blockchain address of the registrant, and the proof of registration message, the signature verification program validates the signature using the private key, and the blockchain network stores in the blockchain an association between the identifier and the blockchain address for the registrant.

Various optional features of the above embodiments include the following. The identifier may further include a subdomain name. The identifier may further include a path name. The registry signature verification program may be further configured to submit for storage in the blockchain the association between the identifier and the blockchain address for the registrant. The method may include using the private key, signing, by the DNS registry, a top level domain name corresponding to the domain name and a blockchain address of the registry signature verification program to form an ownership message; and providing the ownership message to the blockchain network for inclusion in the blockchain. The providing, by the DNS registry, the proof of registration message may include providing, by the DNS registry, the identifier, the blockchain address for the registrant, and the proof of registration message to the blockchain network for processing by the registry signature verification program.

According to various embodiments, a domain name system (DNS) registrar facilitated method of assigning an identifier including a domain name registered to a registrant to a blockchain address for the registrant in a blockchain network is presented. The method includes sending, by a DNS registrar for the domain name, and to a DNS registry for the domain name, a request for a proof of registrar of record for the domain name, where the request includes the domain name; receiving, by the DNS registrar, and from the DNS registry, a proof of registration message, where the proof of registration message includes a signature by a private key of the registry and confirms that the DNS registrar is a registrar of record for the domain name; and sending, by the DNS registrar, and to the blockchain network, the identifier, the blockchain address for the registrant, and the signature; such that a node in the blockchain network validates the signature using a public key corresponding to the private key of the registry and stores in the blockchain an association between the identifier and the blockchain address for the registrant.

Various optional features of the above embodiments include the following. The identifier may further include a subdomain name. The identifier may further include a path name. The sending, by the DNS registrar, and to the blockchain network, the identifier, the blockchain address for the registrant, and the signature, may further include sending the identifier, the blockchain address for the registrant, and the signature to a node in the blockchain network that includes a computer executable registry signature verification program configured to validate registry signatures and receive an authorization message originated by an electronic wallet of the registrant prior to it storing in the blockchain the association between the identifier and the blockchain address for the registrant.

According to various embodiments, a domain name system (DNS) registry configured to assign an identifier including a domain name registered to a registrant to a blockchain address for the registrant in a blockchain network is presented. The registry performs operations including: obtaining a cryptographic asymmetric proof key pair including a public key and a private key; providing the public key and a computer executable registry signature verification program for addition to a block in a blockchain of the blockchain network, where the registry signature verification program is configured to use the public key to validate signatures made using the private key; receiving a request for a proof of registrar of record for the domain name from a registrar of record for the domain name, where the request includes the domain name; confirming that the registrar is a registrar of record for the domain name; and providing a proof of registration message, where the proof of registration message includes a signature by the private key and confirms that the registrar is a registrar of record for the domain name; such that the blockchain network receives the identifier, the blockchain address of the registrant, and the proof of registration message, the signature verification program validates the signature using the private key, and the blockchain network stores in the blockchain an association between the identifier and the blockchain address for the registrant.

Various optional features of the above embodiments include the following. The identifier may further include a subdomain name. The identifier may further include a path name. The registry signature verification program may be further configured to submit for storage in the blockchain the association between the identifier and the blockchain address for the registrant. The operations may further include: using the private key, signing a top level domain name corresponding to the domain name and a blockchain address of the registry signature verification program to form an ownership message; and providing the ownership message to the blockchain network for inclusion in the blockchain. The providing the proof of registration message may include providing the identifier, the blockchain address for the registrant, and the proof of registration message to the blockchain network for processing by the registry signature verification program.

According to various embodiments, a domain name system (DNS) registrar configured to assign an identifier including a domain name registered to a registrant to a blockchain address for the registrant in a blockchain network is presented. The registrar performs operations including: sending, by a DNS registrar for the domain name, and to a DNS registry for the domain name, a request for a proof of registrar of record for the domain name, where the request includes the domain name; receiving, from the DNS registry, a proof of registration message, where the proof of registration message includes a signature by a private key of the registry and confirms that the DNS registrar is a registrar of record for the domain name; and sending, to the blockchain network, the identifier, the blockchain address for the registrant, and the signature; such that a node in the blockchain network validates the signature using a public key corresponding to the private key of the registry and stores in the blockchain an association between the identifier and the blockchain address for the registrant.

Various optional features of the above embodiments include the following. The identifier may further include a subdomain name. The identifier may further include a path name. The sending to the blockchain network, the identifier, the blockchain address for the registrant, and the signature, may further include sending the identifier, the blockchain address for the registrant, and the signature to a node in the blockchain network that includes a computer executable registry signature verification program configured to validate registry signatures and receive an authorization message originated by an electronic wallet of the registrant prior to it storing in the blockchain the association between the identifier and the blockchain address for the registrant.

Part D Summary

Non-transitory computer readable media including computer readable instructions that configure a computer associated with a blockchain to utilize DNS-stored blockchain address information concerning associations of domain names to blockchain addresses by performing operations including: receiving a domain name; retrieving over the internet a Domain Name System (DNS) resource record for the domain name; extracting blockchain address information associated with the domain name from the DNS resource record, where the blockchain address information is signed by a private key of an asymmetric cryptographic scheme; and initiating a blockchain action based on the blockchain address information.

Various optional features of the above embodiments include the following. The blockchain address information may include a blockchain address corresponding to the domain name. The blockchain address information may include a blockchain address for a blockchain directory, where the blockchain directory includes an entry that associates the domain name with a blockchain address corresponding to the domain name. The operations may further include: extracting a first blockchain address from the blockchain based on the domain name; deriving a second blockchain address from the blockchain address information; and alerting a user of the computer that the first blockchain address does not match the second blockchain address. The blockchain address information may be signed by a private key of a blockchain key pair of a registrant of the domain name. The operations may further include obtaining an identification of a signer of the blockchain address information from the blockchain. The obtaining the identification of the signer of the blockchain address information from the blockchain may include obtaining the identification of the signer of the blockchain address information from a blockchain directory. The blockchain action may include submitting a transaction for recordation in the blockchain. The computer may include a blockchain node. The computer may include a blockchain wallet.

According to various embodiments, a method of utilizing DNS-stored blockchain address information concerning associations of domain names to blockchain addresses for a blockchain is presented. The method include: receiving a domain name; retrieving over the internet a Domain Name System (DNS) resource record for the domain name; extracting blockchain address information associated with the domain name from the DNS resource record, where the blockchain address information is signed by a private key of an asymmetric cryptographic scheme; and initiating a blockchain action based on the blockchain address information.

Various optional features of the above embodiments include the following. The blockchain address information may include a blockchain address corresponding to the domain name. The blockchain address information may include a blockchain address for a blockchain directory, where the blockchain directory includes an entry that associates the domain name with a blockchain address corresponding to the domain name. The method may include extracting a first blockchain address from the blockchain based on the domain name; deriving a second blockchain address from the blockchain address information; and alerting a user of the computer that the first blockchain address does not match the second blockchain address. The blockchain address information may be signed by a private key of a blockchain key pair of a registrant of the domain name. The method may include obtaining an identification of a signer of the blockchain address information from the blockchain. The obtaining the identification of the signer of the blockchain address information from the blockchain may include obtaining the identification of the signer of the blockchain address information from a blockchain directory. The blockchain action may include submitting a transaction for recordation in the blockchain. The computer may include a blockchain node. The computer may include a blockchain wallet.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 13 depicts a user interface for managing identifiers that include domain names as blockchain addresses according to various embodiments;

DESCRIPTION OF THE EMBODIMENTS

Figure 1:
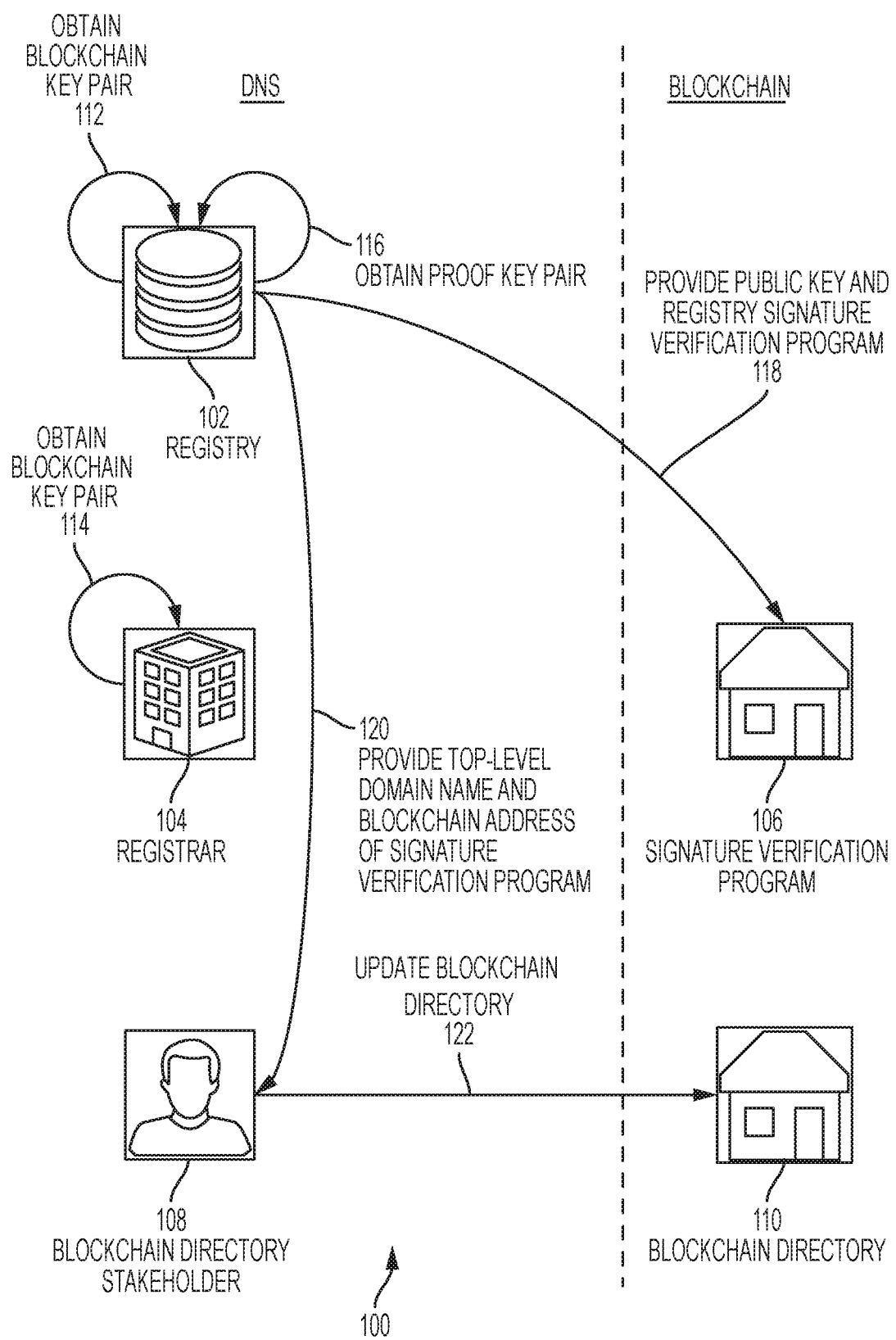
FIG. 1 is a hybrid diagram of a setup method to prepare for assigning a DNS domain name registered to a registrant as a blockchain address in a blockchain network according to various embodiments.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

The present disclosure includes four parts. Part A discloses systems for, and methods of, using domain names as blockchain addresses. Part B discloses systems for, and methods of, using a blockchain to manage identities, including blockchain identities, for multiple networks. Part C discloses systems for, and methods of, using identifiers that include second-level domain names, e.g., subdomains and paths, as blockchain addresses. Part D discloses systems for, and methods of, discovering, and providing assurances of, associations between domain names and blockchain identifiers.

Part E discloses combinations of embodiments from parts A, B, C, and D. That is, although the parts disclose techniques that can operate independently, such techniques may also be combined. Examples of such combinations are presented herein throughout, and particularly in Part E.

Part A: Domain Name Blockchain Addresses

I. Overview

Some embodiments provide the ability to use domain name registrations purchased in the traditional Domain Name System (DNS) environment (e.g. at a registrar) in a blockchain environment. For example, if a registrant registers example.com, they may wish to be able to use it as their blockchain address. This enables a human friendly way to interact with other blockchain participants by using domain names as addresses instead of seemingly arbitrary strings of numbers and letters, such as public keys or hashes thereof. Further, it permits blockchain participants to utilize their web presence, e.g., example.com, as their blockchain presence.

Some embodiments leverage information known by each party—registry, registrar, and registrant—to prove domain name registration, which is then utilized by a registrant to securely claim a domain name as their blockchain address. At a high level, some embodiments may include two phases. First, a setup phase creates and/or provisions components in the DNS and blockchain environments. Second, an execution phase occurs where a domain name is pushed from the DNS environment into the blockchain environment, e.g., at the request of the registrant.

Embodiments include many innovations, benefits, and technical advantages. For example, some embodiments establish a direct approach for registrants to utilize their DNS domain names in a blockchain network. To that end, some embodiments insert an executable program, a registry signature verification program, described in detail herein, into the blockchain. The registry signature verification program is provided and maintained by a respective registry for the associated top-level domain.

As another example, some embodiments provide a way for the registry signature verification program to verify the claim of domain name registration via a cryptographic asymmetric key system. This verification may ensure that only registry approved domain names can be added to the blockchain. This is advantageous because many blockchains do not allow for external network connections to be established to fetch or retrieve information, e.g., a public key to use for validation purposes. External network connections are prevented because external sources may risk breaking the blockchain nodes' ability to rely on the same information, e.g., an external network may go offline or provide different answers to different nodes which would break the blockchain network's ability to reach consensus. The cryptographic asymmetric key approach resolves this by supplying a public key in such a way that the entire blockchain has access to it. For example, in some embodiments, the public key is provisioned during the creation of the registry signature verification program. Therefore, confusion is avoided in the blockchain network about how to validate signed messages, and a consensus can be reached.

As yet another example, some embodiments establish and utilize an Extensible Provisioning Protocol (EPP) extension or utilize an existing domain object extension and associated commands if such extension and commands provide the disclosed functionality. Such EPP extensions are referred to herein as providing a "registrar of record proof". According to some embodiments, this extension may include a single command, e.g., INFO, that accepts as arguments a domain name and a blockchain address. A registry receiving a properly formed INFO command may compare the registrar of record for the domain name as recorded in the registry database with the registrar that is making the particular INFO call. If a match is found, the registry may sign the domain name and blockchain address and pass the signed message back to the requesting registrar. Otherwise, the registry may return an error. This process proves that the registry, which is the trusted authority for all of a top-level domain's domain names, has confirmed that a particular registrar's request is valid.

According to an embodiment, usage of DNS Security (DNSSEC) is not required. According to an embodiment, delegating a domain name into a zone is not required.

These and other features and advantages are described in detail herein.

II. Setup Phase

FIG. 1 is a hybrid diagram of a setup method 100 to prepare for assigning a DNS domain name registered to a registrant as a blockchain address in a blockchain network according to various embodiments. Setup method 100 may be performed to establish and configure the hardware, software, and protocol components used to perform the methods shown and described below in reference to FIGS. 2-5. The left hand side of the diagram depicts the DNS environment, and the right hand side depicts the blockchain environment.

Setup method 100 may begin with registry 102 obtaining 112 a blockchain key pair and registrar 104 obtaining 114 a blockchain key pair. These blockchain key pairs are the registry's 102 and the registrar's 104 blockchain keys, which they may use to perform blockchain transactions. According to an embodiment, registry 102 and registrar 104 may obtain respective addresses instead of respective blockchain user public keys according to some embodiments. Registry 102 and registrar 104 may obtain their respective blockchain key pairs (or respective private keys and addresses) by generating them themselves, or by acquiring them from a different entity, such as a certificate authority.

According to some embodiments, registry 102 and registrar 104 obtain their respective key pairs (or respective private keys and addresses) through the use of, or by acquiring, respective electronic wallets. As used herein, a "wallet" is a computer executable software program or application that facilitates interactions with a blockchain network. The wallet may execute on a user device such as a personal computer or a smart phone. The wallet may be used in cryptocurrency blockchain networks to facilitate the sending and receiving of cryptocurrency with other participants in the network. A standard wallet may have built in user-callable functionality to generate blockchain key pairs (or private keys and addresses) and send and receive cryptocurrency. The wallet, as contemplated herein, may have additional functionality as described further herein.

After registry 102 and registrar 104 have obtained their respective key pairs, according to setup method 100, registry 102 may add support for an EPP extension referred to herein as a "registrar of record proof". The registrar of record proof may be used to prove that a given registrar is the registrar of record for a particular specified domain, i.e., that a registrant used the particular registrar that requests the registrar of record proof to register their domain name. To support such an EPP extension, registry 102 may utilize facilities of EPP and eXtensible Markup Language (XML) to configure its existing EPP interface to handle registrar of record proof requests—using either a new or and existing domain object extension and associated commands. Further, registry 102 obtains 116 (e.g., generates) a new cryptographic asymmetric key pair, referred to herein as the "proof key pair", of which the private key is used to sign the registrar of record proofs. The public key of the proof key pair may be used by registrars to verify that proofs responsive to their registrar of record proof requests came from the exact registry 102 to which they sent the request and have not been altered, e.g., by a man-in-the-middle attack.

In use, once registry 102 establishes registrar of record proof EPP support, a registrar (e.g., registrar 104) may request such a proof from registry 102. Such a request may be formatted using XML according to EPP convention, for example. The request may include a domain name and possibly additional information such as a blockchain address as described further below in reference to FIGS. 2-5. The request itself includes information identifying the originating registrar, such as the Internet Protocol (IP) address of the registrar. To respond to the request, registry 102 first checks whether the registrar that sent the request is the registrar of record for the domain name supplied in the request according to its records. If not, then registry 102 may return an error message. If so, then registry 102 returns a message, referred to herein as the "registrar of record proof" or "proof" if clear from context, containing the domain name and other information provided by the requester (e.g., a blockchain address) that it has signed using the private key from its proof key pair obtained 116 previously.

According to some embodiments, the proof may have an expiration attached to it by the registry. This ensures a replay attack is prevented, e.g. to prevent a previous registrant from claiming the domain name too far into the future when they may have transferred the domain to a different registrant. The time limit is a matter of registry policy, and may be on the order of one, two, three, or more days, or coextensive with the expiration of the domain name's registration.

Note that there is an implied trust between registry 102 and registrar 104. The proof asserts that a specified domain name is managed by a particular registrar. Registry 102 relies on registrar 104 to only act explicitly on behalf of a valid registrant. If registrar 104 is found to be acting negligently, e.g., by claiming names on a blockchain for themselves, then it is likely that the registrar would be punished and/or suffer reputational risk. This threat of punishment and/or reputational risk deters bad or negligent acting by registrar 104.

Next, according to setup method 100, registry 102 provides 118 a computer executable registry signature verification program 106 to the blockchain network for inclusion in a block in the blockchain. Registry signature verification program 106 may be in the form of a blockchain smart contract according to some embodiments. According to some embodiments, a smart contract is an executable program stored on the blockchain. According to some embodiments, a smart contract executes at least whenever a blockchain transaction is mined. Registry 102 includes a copy of the public key of its proof key pair in the registry signature verification program. In operation, registry signature verification program 106 performs a registry signature verification algorithm defined by its computer executable code. The registry signature verification algorithm accepts as input data that includes at least an electronic signature, determines whether the signature is valid using the public key, and outputs a response indicating whether or not the signature is valid.

| Example Registry Signature Verification Algorithm |
| --- |
| (1) Input: message that includes electronic signature; |
| (2) Apply public key of proof key pair to signature under control of decryption algorithm; |
| (3) Check whether message body (or hash of message body, depending on scheme) is identical to the result of (2) above; |
| (4) Output: results of determination at step 3. |

The registry signature verification program 106 on the blockchain serves as the entry point to claim a domain name that is already provisioned in the DNS environment. Once a node in the blockchain adds registry signature verification program 106 to a block in the blockchain per the request of registry 102, registry 102 receives back an address of the blockchain indicating where the registry signature verification program 106 is stored in the blockchain. This address serves as a blockchain address for the registry signature verification program 106 in a manner analogous to the use of public keys of blockchain key pairs (or hashed public keys) for that purpose. Thus, the address received by registry 102 indicating where the registry signature verification program 106 is stored in the blockchain is also referred to herein as a "blockchain address" or "address" consistent with the use of those terms to refer to public keys or hashed public keys as blockchain addresses.

Next, according to setup method 100, some embodiments account for blockchain networks that have existing name services as follows. Some blockchain networks permit participants to use names having particular specified formats (but not arbitrary domain names) as their blockchain addresses. Such associations may be held in a "blockchain directory", such as blockchain directory 110. Blockchain directory 110 keeps track of which blockchain addresses have ownership over which names in the blockchain network, that is, the assignments of names to blockchain participants. According to some embodiments, blockchain directory 110 is embodied by, or utilizes, a non-transitory computer executable blockchain name services program stored in a block of the blockchain. According to such embodiments, the blockchain name services program is a smart contract. In operation, the blockchain name services program may accept as input a command to assign a name to a specified blockchain address, along with a specified name, and may store a record of such assignment upon processing such command. Alternately, or in addition, blockchain directory 110 may include or utilize a table of associations between names and blockchain addresses.

For embodiments in which the blockchain network does not include an existing name services framework, such a framework may be added to handle domain names assigned as blockchain addresses per some embodiments. The added framework may include a blockchain name services program as described herein and/or a blockchain directory such as blockchain directory 110.

Thus, according to some embodiments, to account for blockchain networks that have existing name services, registry 102 provides the top-level domain names(s) over which it has registration authority (e.g., the extensions dot com, dot net, dot edu, etc.), along with the blockchain address of the registry signature verification program 106, to the blockchain directory stakeholder 108 (e.g., owner or manager). Blockchain directory stakeholder 108 may then update 122 blockchain directory 110 with the provided information, that is, with information indicating that the top-level domain names are owned, in the blockchain sense, by registry signature verification program 106. That is, Blockchain directory stakeholder 108 may perform such an update 122 by passing the top-level domain names(s) over which it has registration authority and the blockchain address of the registry signature verification program 106 to the name services program, which updates a record of the assignment.

Alternately, according to some embodiments, to account for blockchain networks that have existing name services, instead of the providing 120 and the updating 122 described above, registry 102 may submit to the blockchain network for inclusion in the blockchain a message that includes the top-level domain name(s) (e.g., dot com, dot net, dot edu, etc.) for which registration is handled by registry 102 and the blockchain address of the signature verification program 106, signed by the private key of the blockchain key pair of registry 102. The message may be submitted to the blockchain network for inclusion in a block to indicate that registry 102 has, in a blockchain transaction sense, conveyed ownership of the top-level domain name to the registry proof verification program at the provided blockchain address, at least for purposes of assigning domain names under the top-level domain name as blockchain addresses in the blockchain network.

Finally, according to setup method 100, registrar 104 (or a trusted service provider) may add functionality to their website or service to enable domain name registrants to sign in and request a domain name be assigned as their blockchain address. This may include adding, or reconfiguring an existing, user interface and adding functionality for fetching proofs from registry 102, and may also include functionality for registrar 104 to submit the proof to the blockchain.

The service providers considered herein are trusted by some or all interested parties. As disclosed herein, a user (e.g., domain name registrant) can take actions through any of a variety of trust chains. For example, the user may act through the registrar or registry, which may make changes to the blockchain. Alternately, the user may act through a trusted service provider, e.g., a third party trusted service provider, which may make changes to the blockchain directly, through a registry, through a registrar, or through a registrant, which takes actions through the associated registry. In sum, service providers as contemplated herein are trusted to interact with many different entities on behalf of a registrant.

III. Execution Phase

Figure 2:
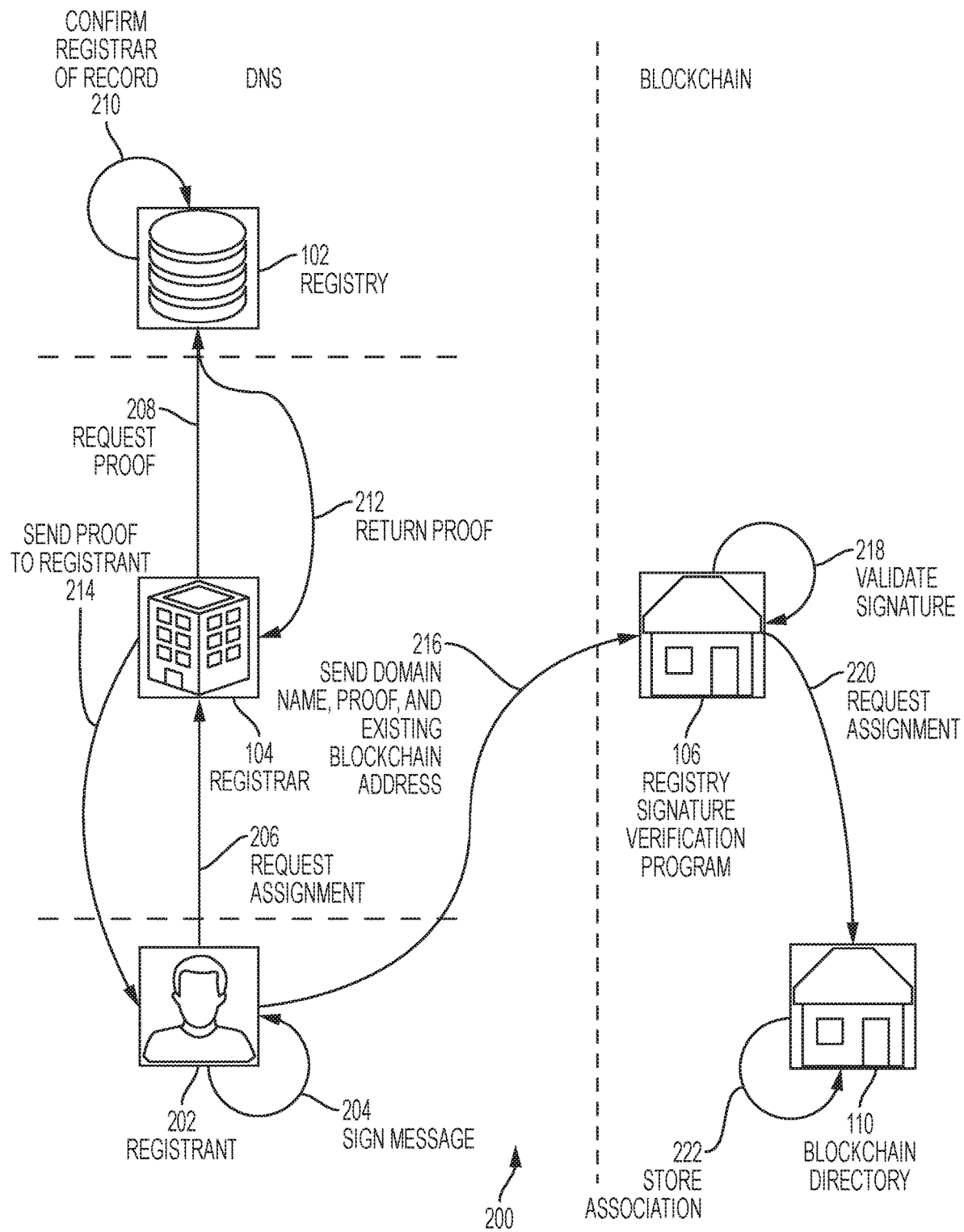
FIG. 2 is a hybrid diagram of a registrant facilitated method for assigning a DNS domain name registered to a registrant as a blockchain address in a blockchain network according to various embodiments.

FIG. 2 is a hybrid diagram of a registrant facilitated method 200 for assigning a DNS domain name registered to registrant 202 as a blockchain address in a blockchain network according to various embodiments. For convenience, method 200 is described in reference to the same registry 102, registrar 104, registry signature verification program 106, and blockchain directory 110 as described above in reference to FIG. 1. Method 200 may be initiated by a registrant, such as registrant 202. The actions performed by registrant 202 in method 200 may be performed through or by the registrant's wallet according to some embodiments.

Method 200 may include, according to some embodiments, a process of registrant 202 signing 204 their existing, e.g., numeric or alphanumeric, blockchain address using their blockchain private key to create a proof of blockchain address ownership. This process may be accomplished any time prior to registrant 202 requesting 206 assignment of a domain name to their existing blockchain address. Later, the proof of blockchain address ownership may be passed to registrar 104 to be validated, once registrar 104 receives a message from registrant 202 specifying a domain name and existing blockchain address and requesting 206 assignment of the specified domain name as the user's specified existing blockchain address. To validate the proof of blockchain address ownership at that point, registry 102 may verify the signature using the public key of the user's blockchain key pair and check whether the specified blockchain address in the message matches the blockchain address that is signed in the proof.

The domain name assignment method 200 may be initiated by registrant 202 by requesting 206 assignment of a specified domain name that is registered to registrant 202 and, for method 200 according to some embodiments, a blockchain address to which to assign the domain name. Registrant 202 may send a request message with this data to registrar 104. The message may also include the proof of blockchain address ownership and/or an identification of the particular blockchain, e.g., in embodiments that provide method 200 for multiple blockchains. According to some embodiments, registrant 202 initiates the process through a webpage interface provided by registrar 104.

Next, per method 200, registrar 104 requests 208 a registrar of record proof from registry 102. The request may include, for example, the domain name and blockchain address specified by registrant 202.

Next, per method 200, registry 102 confirms 210 that the registrar that sent the request is the registrar of record for the provided domain name, e.g., using the originating IP address of the request, to identify the requesting registrar. Registry 102 may check the IP address (or other identifier) against its stored registrar records. If a registrar of record match is found, then method 200 proceeds to the next step in the process; otherwise, the process may halt at this stage, possibly after registry 102 returns an error message to registrar 104, which returns a like error message to registrant 202.

Next, per method 200, registry 102 returns 212 a registrar of record proof signed with the private key of the proof key pair obtained 116 during the setup phase shown and described above in reference to FIG. 1. The proof may include <domain name> in the proof's body along with a signature on <domain name>. According to some embodiments, the proof may include the pair <domain name, address> in the proof's body along with a signature on <domain name, address>. The proof is used later by registry signature verification program 106 to verify that the <domain name, address> combination is valid and that assignment of the domain name should be given to the address.

Next, per method 200, registrar 104 sends 214 the proof to registrant 202 per registrant facilitated embodiments as presented herein.

Per method 200, registrant 202 receives the proof and forms a message containing the proof, the domain name, and the address. Registrant 202 may send 216 the message to registry signature verification program 106. This may be accomplished by the registrant's wallet without requiring further involvement by the user or human registrant.

Next, per method 200, registry signature verification program 106 may validate 218 the registry's signature on the proof received from registrant 202 using the public key of the proof key pair provisioned during the setup phase. If not valid, then the process may halt, possibly with an error message conveyed from registry signature verification program 106 back to registrant 202 and/or registrar 104. Otherwise, method 200 proceeds as follows.

Next, per method 200, registry signature verification program 200 may request 220 assignment of the domain name as the registrant's blockchain address by sending a message to blockchain directory 110. In embodiments where blockchain directory 110 includes an executable program such as a smart contract, the message may be in the form of a command to assign the domain name as registrant's new blockchain address. According to such embodiments, the command may specify the domain name and the existing blockchain address of registrant 202.

Next, per method 200, blockchain directory 110 may store 222 an association between the domain name and the blockchain address. Such an association may be stored in a table, for example.

According to registrant facilitated method 200, registrant 202 may send the proof, domain name, and existing blockchain address to registry signature verification program 106. However, according to alternate embodiments, these data may instead be conveyed to registry signature verification program 106 by registry 102 or registrar 104. In general, the conveyance can be done by any entity, such as a trusted service provider, that may have access to the data. Registry signature verification program 106 does not require that the message come from any particular source. Thus, according to embodiments, FIG. 3 depicts a registrar facilitated method 300, and FIG. 4 depicts a registry facilitated method 400.

Figure 3:
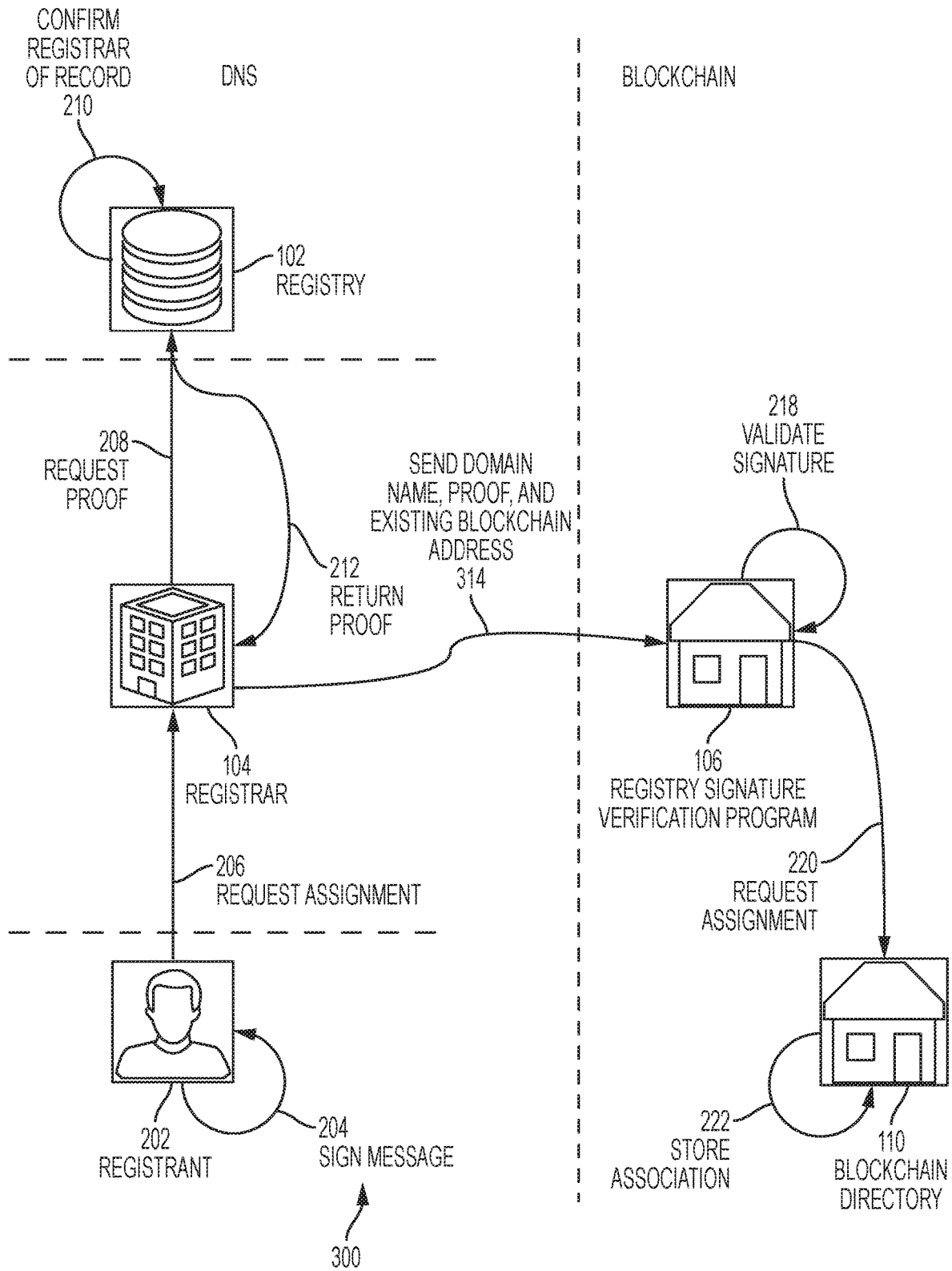
FIG. 3 is a hybrid diagram of a registrar facilitated method for assigning a DNS domain name registered to a registrant as a blockchain address in a blockchain network according to various embodiments.
Figure 4:
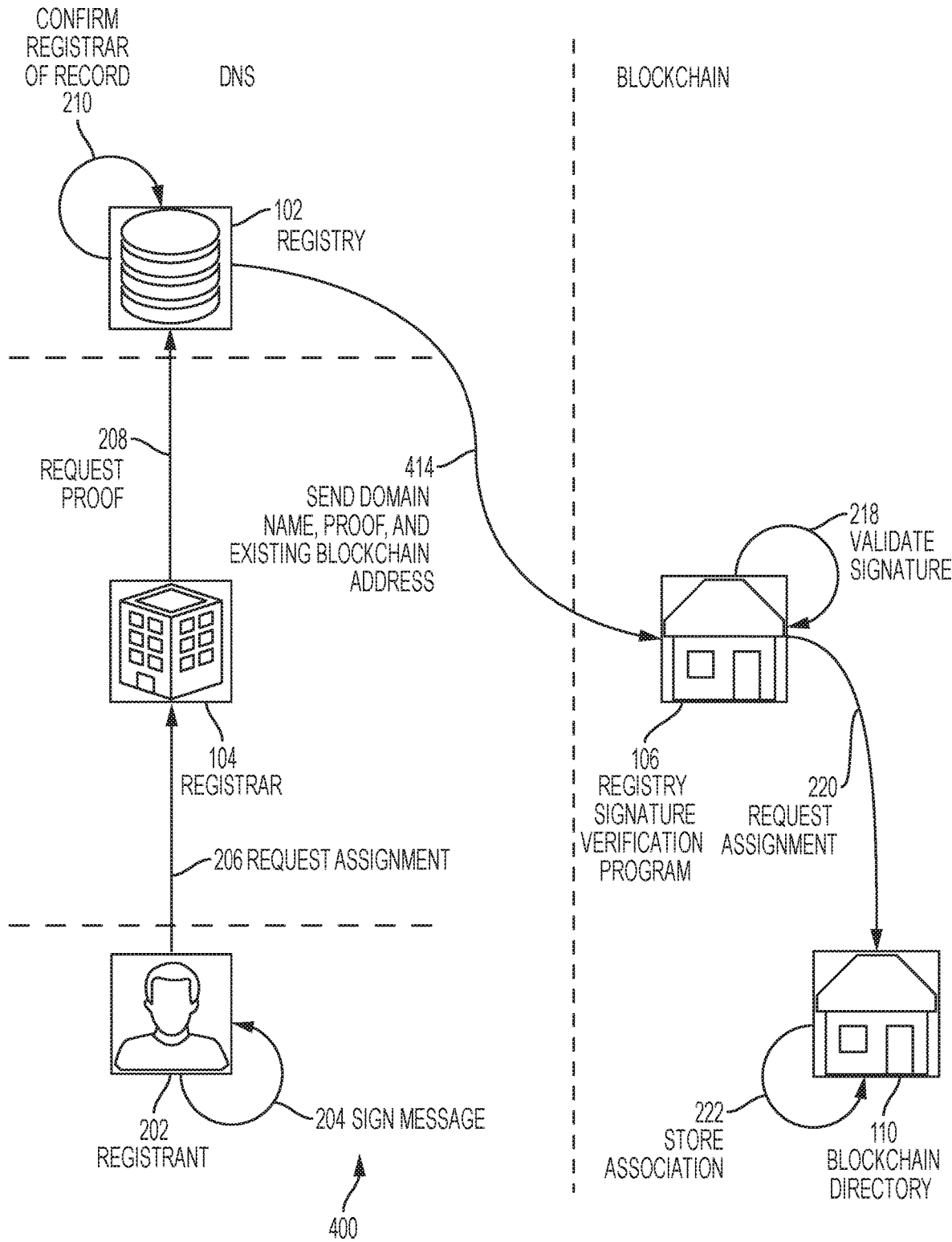
FIG. 4 is a hybrid diagram of a registry facilitated method for assigning a DNS domain name registered to a registrant as a blockchain address in a blockchain network according to various embodiments.

FIG. 3 is a hybrid diagram of a registrar facilitated method 300 for assigning a DNS domain name registered to registrant 202 as a blockchain address in a blockchain network according to various embodiments. The entities and steps depicted in the hybrid diagram that share identifying numerals with the entities and actions depicted in the hybrid diagram of FIG. 2 are described in detail above in reference to FIG. 2. Further, method 300 is essentially identical or similar to method 200 up to the point at which registry 102 returns 212 the proof to registrar 104, except that registrant 202 includes their existing blockchain address in the request 206 assignment message, which inclusion is optional in method 200. Therefore, description of method 300 proceeds by describing the features that are unique to method 300.

Once registrar 104 receives the proof returned 212 from registry 102, instead of sending 214 the proof to registrant 202 as per method 200, registrar 104 forms a message and sends 314 it to registry signature verification program 106. In particular, registrar 104 forms a message that includes the proof, the domain name, and the address.

The remaining steps of method 300 are as described above in reference to method 200 of FIG. 2.

FIG. 4 is a hybrid diagram of a registry facilitated method 400 for assigning a DNS domain name registered to a registrant 202 as a blockchain address in a blockchain network according to various embodiments. Like the hybrid diagram of FIG. 3, the entities and steps depicted in the hybrid diagram of FIG. 4 that share identifying numerals with the entities and steps depicted in the hybrid diagram of FIG. 2 are described in detail above in reference to FIG. 2. Further, method 400 is essentially identical or similar to method 200 up to the point at which registry 102 confirms 210 the registrar of record, except that, as in method 300, per method 400, registrant 202 also includes their existing blockchain address in the request 206 assignment message. Therefore, description of method 400 proceeds by describing the features that are unique to method 400.

Per method 400, after registry 102 confirms 210 the registrar of record, instead of returning 212 the proof to registrar 104 as per methods 200 and 300, registry 102 may form a message and send 414 it to registry signature verification program 106. In particular, registry 102 may form a message that includes, for example, the proof, the domain name, and the address.

The remaining steps of method 400 are as described above in reference to method 200 of FIG. 2.

Figure 5:
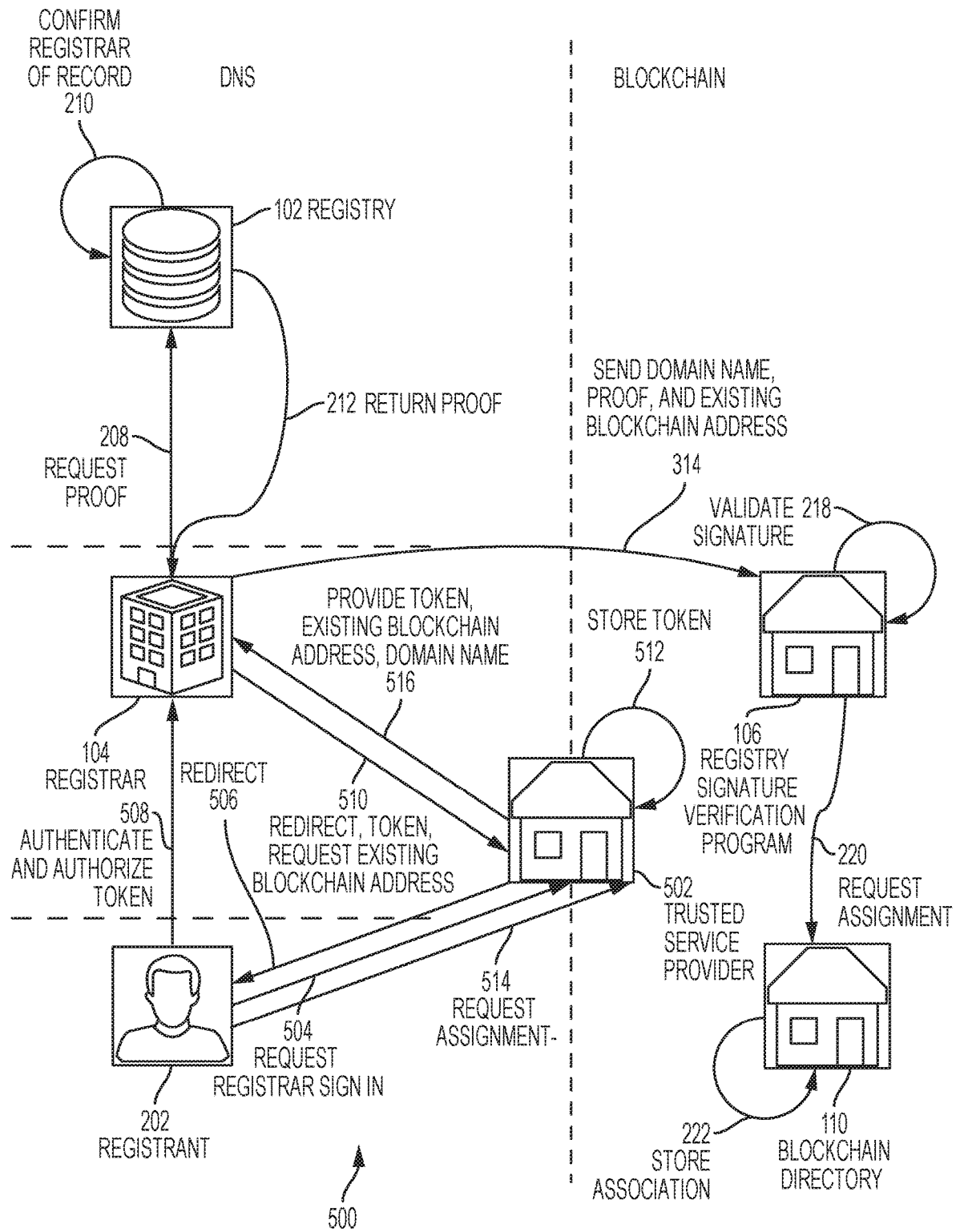
FIG. 5 is a hybrid diagram of a trusted service provider facilitated method for assigning a DNS domain name registered to a registrant as a blockchain address in a blockchain network according to various embodiments.

FIG. 5 is a hybrid diagram of a trusted service provider 502 facilitated method 500 for assigning a DNS domain name registered to a registrant as a blockchain address in a blockchain network according to various embodiments. The trusted service provider 502 may be, for example, a DNS operator, a website hosting provider, a resolver, or a different type of service provider. Method 500 also involves registry 102, registrar 104, registry signature verification program 106, and blockchain directory 110, as described above in reference to FIGS. 1 and 2. Method 500 may be initiated by a registrant such as registrant 202. Some or all of the actions performed by registrant 202 in method 500 may be performed through or by the registrant's wallet according to some embodiments. According to other embodiments, the communications between registrant 202 and trusted service provider 502 may be performed through a web-based user interface provided by trusted service provider 502, which registrant 202 interacts with through a browser executing on registrant's client computer. In contrast to embodiments of methods 200, 300, and 400, method 500 utilizes an authorization token, as explained presently.

Method 500 may begin with registrant 202 requesting 504 that trusted service provider 502 sign in to, or otherwise authenticate with, registrar 104. (As with other embodiments described herein, registrar 104 is the registrar of record of the domain name registered to registrant 202.) In response, trusted service provider 502 redirects 506 the registrant's browser to registrar 104, more particularly, to an authentication or sign in web page of registrar 104.

Next, per method 500, registrant 202 may sign in to, or otherwise authenticate 508 with, registrar 104. If registrant 202 does not already have an existing account with registrar 104, an account may be established by registrant 202 at this point before proceeding. The signing in (or authenticating) may include, for example, registrant 202 providing a user name and a password for their account with registrar 104. Further, registrant 202 may authorize 508 registrar 104 to generate an access token for use by trusted service provider 502 to facilitate the blockchain user name assignment. The access token may be, for example, an Open Authorization (OAuth) access token according to some embodiments.

Next, per method 500, trusted service provider 502 redirects 510 the registrant's browser back to trusted service provider 502, and also passes it the access token. Further, registrar 104 may request the existing blockchain address of registrant 202 at this stage. According to an embodiment, trusted service provider 502 may store 512 the access token for future usage.

Either at this point in method 500, or previously in method 500, registrant 202 may request 514 that their registered domain name be assigned as their new blockchain address. The request may include, for example, the existing blockchain address of registrant 202, or registrant 202 may have previously provided that information to trusted service provider 502.

Once trusted service provider 502 has the access token and the existing blockchain address of registrant 202, and registrant 202 has requested the assignment, trusted service provider 502 provides 516 the access token, the existing blockchain address of registrant 202, and the domain name to registrar 104.

At this point in method 500, the remaining steps are similar to those of method 300 as shown and described above in reference to FIG. 3.

Figure 6:
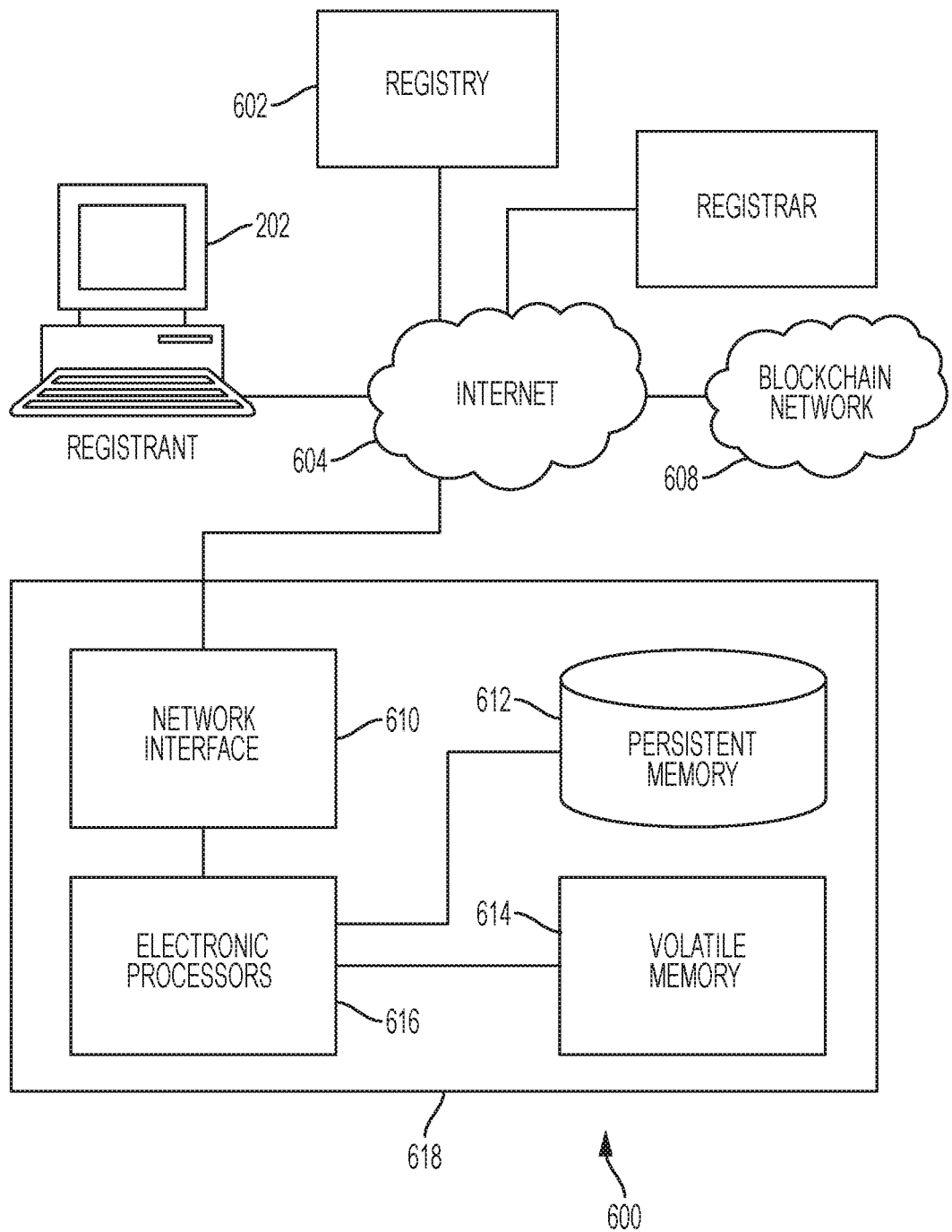
FIG. 6 is a schematic diagram of a system including a server computer according to various embodiments.

FIG. 6 is a schematic diagram of a system 600 including server computer 618 according to various embodiments. System 600 includes, for example, registrant 202 (identified with their computer), DNS registry 602, DNS registrar 604, and server computer 618, all communicatively coupled to the internet 604. System 600 may also include blockchain network 608, which itself may include a plurality of networked nodes, which themselves may be networked through the internet 604. Server computer 618 may be, for example, a server computer of registry 102, registrar 104, or trusted service provider 502, according to various embodiments. Registry 602 may be registry 102, and/or registrar 604 may be registrar 104, consistent with server computer 618 being either registry 102 or registrar 104, according to various embodiments. That is, FIG. 6 is intended to display the various components networked together, as well as the internal workings of a server computer consistent with the various, e.g., registry and registrar, servers disclosed herein.

Server computer 618 may include network interface 610 to communicatively couple to the internet 604. Network interface 610 may include a physical network interface, such as a network adapter. Server computer 618 may be a special-purpose computer, adapted for reliability and high-bandwidth communications. Thus, server computer 618 may be embodied in a cluster of individual hardware server computers, for example. Alternately, or in addition, server computer 618 may include redundant power supplies. Persistent memory 612 may be in a Redundant Array of Inexpensive Disk drives (RAID) configuration for added reliability, and volatile memory 614 may be or include Error-Correcting Code (ECC) memory hardware devices. Server computer 618 further includes one or more electronic processors 616, which may be multi-core processors suitable for handling large amounts of information. Electronic processors 616 are communicatively coupled to persistent memory 612, and may execute instructions stored thereon to at least partially effectuate the techniques, functions, and operations disclosed herein, e.g., method 100 as shown and described above in reference to FIG. 1, method 200 as shown and described in reference to FIG. 2, method 300 as shown and described in reference to FIG. 3, method 400 as shown and described in reference to FIG. 4, method 500 as shown and described in reference to FIG. 5, any variation, modification, or alternate methods as described in the following section, as well as method 700 of FIG. 7, method 800 of FIG. 8, method 900 of FIG. 9, method 1000 of FIG. 10, method 1100 of FIG. 11, method 1200 of FIG. 12, method 1600 of FIG. 16, method 1700 of FIG. 17, and any combinations or variations as disclosed in Part E. Electronic processors 616 are also communicatively coupled to volatile memory 614.

IV. Variations, Modifications, and Alternate Embodiments

Many variations on the disclosed embodiments are possible. Some example variations and modifications are presented below.

a. Higher Level Domain Names

Some embodiments permit assigning domain names that include second-level (and higher-level) domain names as blockchain addresses in a blockchain network. For example, an entity may register the domain name example.com. As such, the entity has implicitly registered any domain names that include second or higher level domain names under the domain name example.com. Thus, the same entity may control then entire name space under example.com, which includes first.example.com, big.example.com, purple.example.com, etc. Such an entity may use method 100 and any of methods 200, 300, 400, or 500, in the stead of registrant 202, to assign domain names that include second or higher level domain names under example.com as blockchain addresses for anyone, not limited to the entity themselves. Thus, the entity that registered example.com may have a web-based business that provides blockchain name assignments to its customers. The entity, rather than its customers, may receive a customer's existing blockchain address and proceed to use any of methods 200, 300, 400, or 500 to assign a domain name that includes a second or higher level domain name under example.com to the customer. Either the entity or the customer may choose the second level (and/or higher) domain name. Note that because the entity has registered example.com, it can ensure that the registrar of record proof procedure described herein is accomplished in order to assign such subdomain names. The usage of higher-level domain names as disclosed here is elaborated upon in Part C, below.

b. Registrant Confirmation Via Wallet

Some embodiments await confirmation from the registrant prior to finalizing the assignment of a domain name as a blockchain address. Any of the disclosed embodiments may implement this variation. For purposes of description rather than limitation, an example embodiment is described relative to method 400 of FIG. 4, with the differences disclosed and explained presently. In such embodiments, the optional step of registrant 202 signing 204 their existing address using their blockchain private key to create a proof of blockchain address ownership may be omitted. Once registry signature verification program 106 receives the domain name, proof, and existing blockchain address sent 414 from registry 102, and once registry signature verification program 106 validates 218 the signature on the proof, it stores a holding record in the blockchain, where the holding record may include, or include references to, the domain name at issue and the registrant's existing blockchain address. In such embodiments, registry signature verification program 106 awaits confirmation to assign the domain name from registrant 202 before proceeding to request 220 assignment from blockchain directory 110. Registrant 202 may provide such confirmation through the registrant's wallet.

In more detail, the electronic wallet may include functionality that detects whether registrant 202 confirmation is required and permits registrant 202 to send such a confirmation to registry signature verification program 106. To detect the registrant 202 confirmation requirement, the wallet may interact with the blockchain, and/or with registry signature verification program 106 to retrieve any pending holding records relevant to registrant 202. The wallet may use the detection of any retrieved holding records that match the existing blockchain address, or registered domain name, of registrant 202, as an initiation to prompt registrant 202 for confirmation. For example, the wallet may display a virtual button labeled using information from the holding record, e.g., "Claim domain name example.com as your blockchain address instead of 0x987 . . . ?", where the actual blockchain address may be presented. Upon registrant 202 providing confirmation via their wallet to registry signature verification program 106, it proceeds to request 220 assignment of the domain name as the blockchain address of registrant 202.

Embodiments that utilize registrant confirmation may thwart or prevent registrant 202 from assigning their domain name as a blockchain address for another blockchain network participant.

c. Registrant Confirmation Via Voiceprint

According to some embodiments, registry 102 and/or registrar 104 may store voiceprints of some or all contacts attached to a domain name. In general, domain name registration involves providing, for example, the registrant's contact information to the registrar of record, which passes it to the respective registry. In some embodiments, the registration process may include the step of some (or all) contacts for the domain name providing voiceprints to the registrar. Such a voice print may be of a contact, such as registrar 202, saying the domain name itself. Registrar 104 may store and pass the received voiceprint(s) to registry 102 for storage. Registry 102 may set up and implement an EPP extension for the purpose of accepting and storing voiceprints via its EPP interface.

Embodiments may utilize the stored voiceprints as follows. Registrar 104 may provide non-transitory computer executable code to manufacturers, supporting companies, or distributors of consumer voice-based computers that facilitates registrant 202 requesting 206 assignment of a domain name for a blockchain address audibly. Such consumer voice-based computers may be associated with, or provided by, a social network or an e-commerce business, for example. An example of a such a consumer voice-based computer is a voice-based digital assistant. The code may be installed on such voice-based computers and, when executed, configure such computers to receive and process audible requests to request 206 assignment. An example, non-limiting format for such requests is, "computer, assign my domain name example.com as my blockchain address in blockchain X in place of address 0x987 . . . ". When a properly configured consumer voice-based computer receives such an audio command, it may proceed to form and send a request to registrar 104 as disclosed above in reference to methods 200, 300, 400, and 500. However, the request may further include, or be preceded or followed by, a request that includes the voiceprint of registrant 202, e.g., the portion of the voiceprint representing the audible domain name itself. Registrar 104 may receive the request and process it as disclosed in reference to methods 200, 300, 400, and 500, after it has successfully verified a match between the received voiceprint and a stored voiceprint. The matching process may be a probabilistic matching process that outputs a probability of a match, and the method may proceed if the output probability exceeds a predetermined or preset threshold, e.g., at least a 95% probability of a match.

According to some embodiments, instead of registrar 104 detecting a voiceprint match, registrar 104 instead passes the received voiceprint to registry 102, which performs the verification of the match between the received voiceprint and a stored voiceprint, and provides the results back to registrar 104. In such embodiments, the remainder of the steps are similar or essentially identical to those of methods 200, 300, 400, and 500 once registry 102 has verified the voiceprint match.

d. Other Identifiers as Blockchain Addresses

Some embodiments assign an identifier other than a domain name as a blockchain address in a blockchain network. Examples of such identifiers include, but are not limited to, telephone numbers and email addresses. Such embodiments differ from the embodiments disclosed herein in Sections II and III as follows. The identifier holder, e.g., the telephone number owner or email address user, takes the place of registrant 202. The entity that provides the identifier, e.g., a phone company for a telephone number or an email provider for an email identifier, takes the place of registry 102. A facilitating company may take the place of registrar 104. The facilitating company may have or may establish a communication channel with the entity that provides the identifier, e.g., the entity that provides the identifier has an internet-based interface or API.

For the setup phase of such embodiments, method 100 proceeds as disclosed above in Section II, except that the entity that provides the identifier performs the actions of registry 102, and the facilitating company performs the actions of registrar 104. Instead of registry 102 adding support for a registrar of record proof EPP extension, the entity that provides the identifier provides support for responding to requests 208 for proof sent by the facilitating company. The requests may be sent through the communication channel between the entity that provides the identifier and the facilitating company. In such embodiments, the entity that provides the identifier obtains and utilizes a proof key pair as disclosed above in Section III. The registry signature verification program 106 may be configured to verify the signatures by the entity that provides the identifier, rather than signatures by registry 102. The signatures may be on data that specifies an identifier such as a phone number or email address and an existing blockchain address, instead of on data that specifies a domain name and an existing blockchain address.

For the execution phase of such embodiments, the entity that provides the identifier performs the actions of registry 102, and the facilitating company performs the actions of registrar 104. Any of methods 200, 300, 400, or 500 may be altered as described presently. The identifier holder, instead of registrant 202, requests 206 assignment of their identifier as a blockchain address. The facilitating company receives the request and requests 208 proof from the entity that provides the identifier. The remaining flow is as described above in Section II for any of methods 200, 300, 400, or 500, mutatis mutandis.

According to some embodiments, the facilitating company may be merged with the entity that provides the identifier. In such embodiments, the entity that provides the identifier may establish an interface that performs the analogous actions of registrar 104. Further, the request 208 for proof may be performed essentially in-house, that is, in a dual facilitating company and entity that provides the identifier. Such embodiments perform as described herein, except that communications 208, 210, and 212 are performed by different portions of the same entity, rather than by different entities.

Embodiments disclosed in this subsection may have the added benefit of enabling secure two-factor identification by consulting the blockchain for a given blockchain network participant's address to fetch additional factors for use to verify their identity. For example, if a given address on a blockchain has an attached phone number or email address, those could be consulted on chain as a source to send a message to, to confirm proof of address ownership.

Further, embodiments disclosed in this subsection may be particularly beneficial to payment providers and their users. As used herein, the term "payment provider" refers to any entity that provides customer accounts to customers that permit such customers to send to and receive payment from other customers using customer identifiers instead of banking information. For example, a payment provider may enable its customers to send and receive money amongst themselves by specifying domain names and currently amounts. In particular, a first customer may log into a payment provider webpage interface by providing a domain name and password, then provide to the interface a domain name of a second customer, as well as a US dollar amount, along with instructions to pay, and the payment provider may respond to such instruction by moving currency between customer accounts as instructed. According to embodiments described in this subsection, a payment provider may assign an existing payment provider identifier (e.g., domain name) as blockchain address. In this way, a payment provider customer may broadcast, publish, or otherwise make known a central payment identifier, e.g., their domain name, along with instructions that the customer may receive payment through such identifier either by way of the standard techniques of the payment provider, or via cryptocurrency using a cryptocurrency blockchain network using the same identifier, e.g., domain name.

Part B: Identity Management Blockchains

V. Overview

Some embodiments according to this Part provide a permissioned blockchain to store user identities from different networks, anchored by domain names. That is, some embodiments provide a blockchain that stores, for each of various users, network identifiers for various networks in association with a domain name registered by the user. Such a blockchain as disclosed herein is referred to herein as an "identity management blockchain".

Networks as contemplated herein include, by way of non-limiting example, blockchain networks, email networks, and social media networks. The names for the networks themselves are referred to herein as "network names", in contrast to the identifications ascribed to users of such networks, which are referred to herein as "network identifiers".

According to various embodiments, the identity management blockchain may associate a domain name with network identifiers of various types. The identity management blockchain may map a domain name to one or more of a user's well-defined network identifiers for respective one or more networks (e.g., map the domain name to a first network identifier in a first network, map the domain name to a second network identifier in a second network, etc.). The identity management blockchain may map a domain name to one or more undefined format network identifiers, e.g., to store arbitrary network or claim information. The identity management blockchain may map a domain name to another domain name (e.g., a link referencing another domain name's associated network identifiers).

According to some embodiments, identity management blockchains may be write restricted and read global.

Writers to identity management blockchains may be trusted third parties that are allowed to write domain-name-to-network-identifier associations. Suitable writers include, for example, the registry for the domain names, as well as any authoritative owner and/or operator of a network that has been granted write access by the registry. Advantageously, the registry holds authority over a top-level domain, e.g., to ensure that only provisioned names are allocated by the correct parties, for example, a registrar of record for the domain name. Note that information may be written to the identity management blockchain in plaintext or via a privacy preserving scheme to facilitate an optional degree of access control for a user's supplied credentials.

Readers of identity management blockchains may, according to various embodiments, include essentially anyone. Such global access allows any client computer to query the identity management blockchain to fetch a network identifier for a particular domain name. However, users may provide access control rules such that only approved parties can read certain information, e.g., only the party with a certain account credential can read the user's driver license identifier. The default level of access control may range from default open to default closed to a hybrid approach where third parties request information and users are notified out-of-band to approve or reject the request for access.

Embodiments have a variety of features and advantages. For example, consider the scenario in which a user has blockchain addresses on Blockchain1, Blockchain2, and Blockchain3. While each system may have its own naming scheme to provide a name that maps to the user's blockchain address, the user would have to be responsible for setting up and managing all such addresses on one network. This is cumbersome, tedious, and difficult to manage. By contrast, some embodiments permit such a user to register a single domain name that not only works in DNS as expected, but is also able to be associated with the user's blockchain addresses in the identity management blockchain. Such a user may thus rely on a single multi-network identifier in the form of a registered domain name, which may also be associated with a website that anyone may navigate to using the domain name.

These and other features are described in detail herein.

VI. Write Requests a. Network Identifiers with Defined Formats

Figure 7:
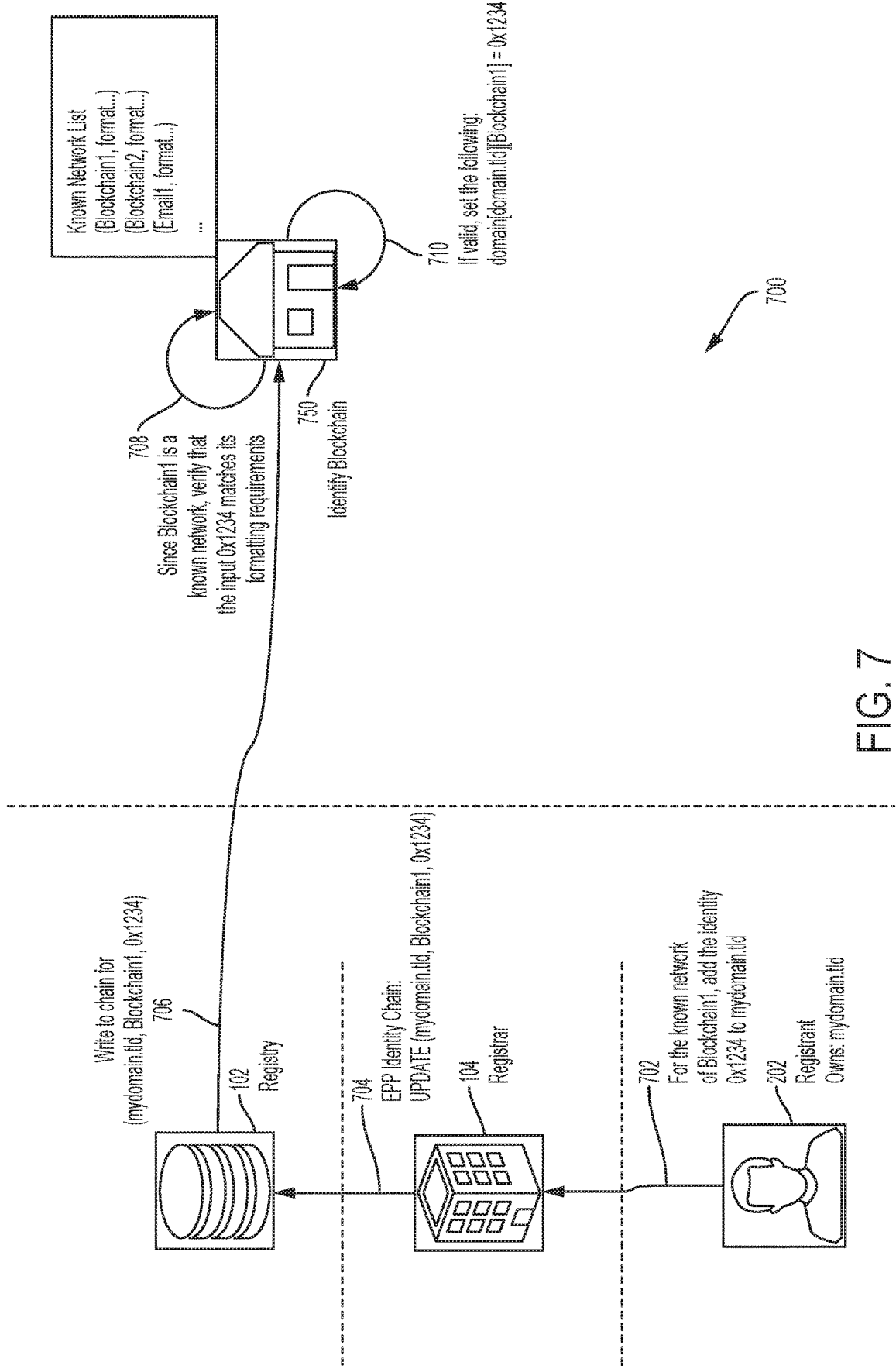
FIG. 7 is a hybrid diagram of a method for adding a record for a network identifier with a defined format to an identity management blockchain according to various embodiments.

FIG. 7 is a hybrid diagram of a method 700 for adding a record for a network identifier with a defined format to an identity management blockchain 750 according to various embodiments. For convenience, method 700 is described in reference to the same registry 102, registrar 104, and registrant 202 as described above in reference to FIG. 2. A benefit of using network identifiers with defined data formats is that it guarantees a consistent output for anyone using such network identifiers. In particular, having information that is guaranteed to be in the right format ensures that such information can be used inside an application. Such a format guarantee as provided by some embodiments may be publicly verifiable by observing the blockchain, which ensures a third party can both trust and verify that information is stored as expected.

Prior to the initiation of method 700, an entity such as registrant 202 or registrar 104 may obtain information regarding required format(s) from identity management blockchain 750 or registry 102. That is, a list of currently supported network names and their data format requirements may be maintained by the writer of identity management blockchain 750 and/or stored in identity management blockchain 750. Users may fetch a list of all such network names and the rules that govern the data held by each association. As an example, if a user queries identity management blockchain 750 or the registry 202 for a list of supported known networks, it may reply with the following non-limiting example table:

| Network | Format | Example |
|---|---|---|
| Blockchain1 | 0x[A-Za-z0-9]{n} | 0xf17f52151ebef6c7334fad080c5704d77216b |
| SocialNtwrk1 | ASCII | name |
| EmailProvider | name@provider.tld | swapneel@provider.tld |

To initiate method 700, at 702, registrant 202 of the example domain name mydomain.tld sends a request to write an association of the domain name to the example network identifier 0x1234 in the example blockchain network Blockchain1 to registrar 104. Thus, the request data may include a domain name, a network name, and a network identifier. The request may be made in a variety of ways. According to some embodiments, registrant 202 uses an online interface provided by registrar 104. According to some embodiments, registrant 202 uses an interface present in a wallet. In both embodiments, registrant 202 supplies the domain name, the network identifier, and the network name, and the interface conveys such information to registrar 104.

At 704, registrar 104, having received the request per 702, and having confirmed that it is a registrar for the provided domain name, sends a corresponding request to registry 102. The corresponding request may be sent via EPP. In general, some embodiments create a new EPP extension to support interactions to add and remove information to identity management blockchain 750. The extension may include any, or a combination, of the following:

CREATE: create an association entry in the blockchain using a particular domain;

UPDATE: update a domain name with at least one additional associated network address;

DELETE: delete a network address from being associated with a domain name;

INFO: retrieve a domain name's associated network address(es); and

CHECK: check if an association is already defined or a domain name is already on identity management blockchain 750.

Thus, per 704, registrar 104 may send a CREATE or UPDATE EPP command to registry 102 setting forth the association between the domain name and the network identifier for the network corresponding to the provided network name.

At 706, registry 102 sends a write request to identity management blockchain 750 the requested association. Registry 102 may convey the information in an ordered triple, e.g., (mydomain.tld, Blockchain1, 0x1234). Registry 102 may convey the information to a smart contract on identity management blockchain 750 that performs actions described below.

At 708, the smart contract on identity management blockchain 750 verifies that the format is correct for the identified network. If so, then the method proceeds to 710. Otherwise, the smart contract may return an error message to registry 102, which may pass a representation of the error message to registrar 104. Registrar 104 may pass a representation of the error message to registrant 202, where it is displayed by the interface used by the registrant 202.

At 710, the smart contract proceeds to write the association to identity management blockchain 750. Subsequently, the smart contract may return a confirmation of the write, which may be passed back to registrant 202 via registry 102 and registrar 104.

b. Additional Data: Time-to-Live Values

Some embodiments include a time-to-live (TTL) value, which may be infinity, for each supplied network identifier. Such embodiments are useful for network identifiers that have a certain shelf-life, e.g., a certificate expires, a domain name expires, a driver license needs to be renewed, etc. Thus, the TTL value may be stated as a particular time and date, or may be stated as an interval, measured in seconds, minutes, weeks, months, or years. A TTL value may therefore be provided by the registrant 202 to be included in identity management blockchain 750 in association with a respective network identifier. In some embodiments, the TTL value may be signed, e.g., by an authority for the respective network, to provide information about the validity of the identifier at a given point in time.

c. Additional Data: Proofs

Some embodiments utilize a signed proof that a network identifier that registrant 202 wishes to associate with a domain name is owned by, or assigned to, registrant 202 in its respective network. Each respective network, or registry 102, may provide such a proof. The proof may be received by the identity management blockchain 750 in any of a variety of ways: trusted known parties may be approved as blockchain writers who validate their specific ownership claims, any network may provide a signed ownership message that will verify/validate via a known public key, or in the case of decentralized blockchains, for example, a user may sign an identifier with their blockchain private key and have it validate based on their public key.

In more detail, and according to various embodiments in which registry 102 provides the proof, after registrant 202 sends a request to registrar 104 at 702, and after registrar 104 confirms that it is a registrar for the domain name provided in the request, but before registrar 104 sends a corresponding request to registry 102 at 704, registrar 104 may confirm that registrant owns or is assigned the network identifier as follows. According to some embodiments, the interface used by registrant 202 to initiate method 700 directs registrant 202 to provide a password for the network identified in the request. That is, either the wallet or the online interface provided by registrar 104 requests that registrant 202 provide their password for the network. Alternatively, according to some embodiments, the interface redirects registrant 202 to the network itself, where registrant 202 logs in by providing their network identifier and password. Subsequently, according to such alternative embodiments, registrant 202 is redirected back to the interface, possibly with an authorization token, at which registrar 104 has confirmation that the network identifier provided in the request is indeed associated with registrant 202. Once registrar 102 has confirmation, by registrant 202 providing their password to either registrar 104 or to the network according to respective embodiments described above, registrar passes the request to registry 102 per 704. Once registry 102 receives the information as attested to by registrar 104, it proceeds to generate a signature on all or part of the information conveyed to identity management blockchain 750 in the write request of 706. Registry 102 then sends the signature to identity management blockchain 750 as part of the write request of 706. The smart contract on identity management blockchain 750, which for such embodiments includes registry signature verification program 106, receives the request and verifies the signature before proceeding to 710.

Alternately, according to various embodiments, the network provides the proof. Such embodiments may proceed as described immediately above in reference to embodiments in which registry 102 provides the proof, up to the point at which registrant 202 provides their network password to either registrar 104 or the network itself. At that point, the network itself generates a signature on data that includes at least the network identifier, and that may additionally include the domain name as proof of ownership. The network then passes the signature to either of registrar 104 or registry 102. If passed to registrar 104, registrar 104 passes the proof to registry 102 as part of the request of 704. In either case, registry 102 includes the proof in its request to identity management blockchain 750 at 706. The smart contract of identity management blockchain 750 receives the request and extracts the proof that includes the signature of the network. As part of the verification of 708, the smart contract of identity management blockchain 750 then passes the proof to a network signature verification program that was previously included in identity management blockchain by the network. The network signature verification program operates the same as registry signature verification program 106, except that it uses a public key of the network to verify the proof instead of the public key of registry 102. If the smart contract successfully verifies the signature, then it may store a copy of the proof in identity management blockchain 750 in association with the respective network identifier. The network signature verification program further provides a response to the smart contract of identity management blockchain 750 indicating whether the verification was successful or not. If the response indicates successful validation, then method 700 proceeds. Otherwise, if the response indicates that verification of the network's signature failed, then the smart contract of identity management blockchain 750 may return an error message, which may pass the error message back to registrant 202, and method 700 may halt.

By using a proof as described, users of an identifier can be confident that the identifier is valid for the domain name.

d. Proofs for Blockchain Networks

For the case where the network that registrant 202 wishes to associate to their domain name is a blockchain network, the proofs described in the above subsection may be handled as follows. By way of non-limiting example, consider that registrant 202 has registered the domain name mydomain.tld and has previously used the techniques of this Section to associate it to the network identifier 0x1234 in the blockchain network Blockchain1. Now, registrant 202 wishes to further associate the domain name mydomain.tld to the example network identifier 0x0101 in the blockchain network Blockchain2. Registrant may use method 700 together with proofs as described in the above subsection as part of this association process, as described in detail below.

According to various embodiments, registrant 202 may initiate method 700 using the wallet for Blockchain2. As part of the request to associate 0x0101 to mydomain.tld, the wallet may generate a proof signed using the private key of registrant 202 in the network of Blockchain2. The user's wallet may generate such a signature. Thus, instead of contacting an external network to obtain a proof of ownership or association, registrant's 202 own wallet may generate the proof. The remainder of the process may be as described in the above subsection.

Thus, according to some embodiments, Blockchain2 may provide a signature verification program to Blockchain1 for inclusion in Blockchain1 for verifying the proof before finalizing the association. Alternatively, the proof may be verified as a preliminary action before performing a transaction, e.g., by a user's wallet.

e. Domain-Name-to-Domain-Name Associations

A particular association of a domain name to a network identifier of a defined format that may be added to the identity management blockchain 750 is that of an association of two domain names. That is, some embodiments support the ability for registrant 202 to link one domain name to another domain name. This allows registrant 202 to place information on the identity management blockchain 750 once, and link other domain names to the existing domain name associations. For example, if John Smith has registered jsmith.tld and johnsmith.tld, he might wish to link the two names together so that he may add network identifiers to one of the names and have querying entities detect all associations, including those stored in association with the other domain name.

Registrant 202 may initiate a request to associate two domain names by sending a request that includes, for example, a first domain name, a second domain name as a network identifier, and an indicator to associate the domain names as a network name. Such an indicator may be, for example, the term "DomainLink".

f. Network Identifiers with Undefined Formats

Figure 8:
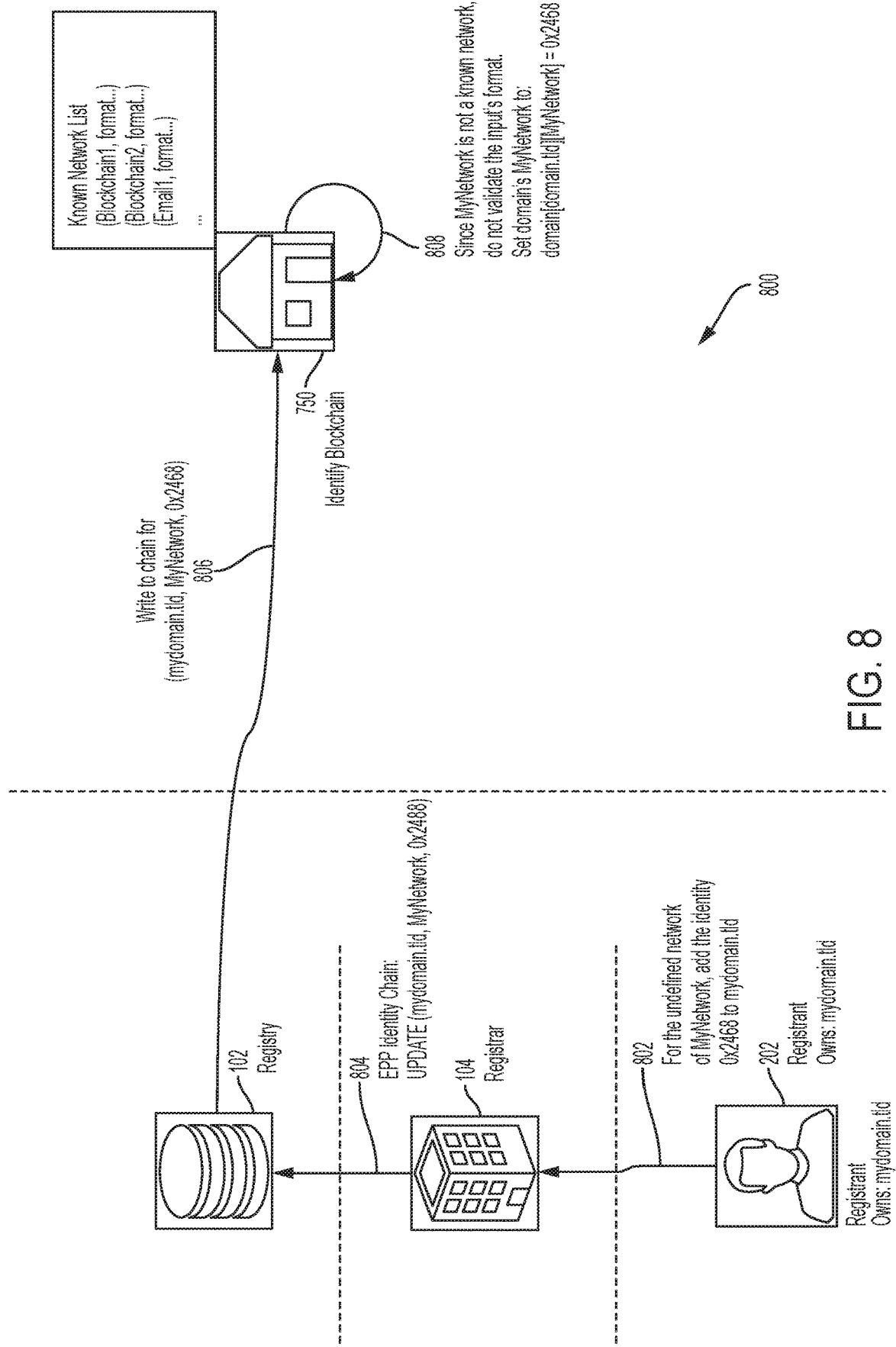
FIG. 8 is a hybrid diagram of a method for adding a record for a network identifier of undefined format to an identity management blockchain according to various embodiments.

FIG. 8 is a hybrid diagram of a method 800 for adding a record for a network identifier of undefined format to identity management blockchain 750 according to various embodiments. Such undefined format network identifiers ensure that users can add arbitrary network identifications and claims to identity management blockchain 750. For example, undefined format network identifiers may be used for networks that are not known to identity management blockchain 750 in the sense that identity management blockchain 750 lacks a format definition for the network identifiers for the network. A difference between known and undefined formats is that undefined format network identifiers do not provide any guarantees about their data's format. Generally, undefined format network identifiers provide a way for users to provide any type of information, with the assumption that the parties they interact with will be able to parse it correctly. For example, undefined network identifiers may store a cryptographic certificate, a list of physical addresses, the address on a newly launched blockchain, etc. For convenience, method 800 is described in reference to the same registry 102, registrar 104, and registrant 202 as described above in reference to FIG. 2.

At 802, registrant 202 of the example domain name mydomain.tld sends a request to write an association of the domain name to the example network identifier 0x2468 in the example network MyNetwork to registrar 104. The request may be made as described above in reference to 702 of FIG. 7. Thus, registrant 202 supplies the domain name, the network identifier, and the network name, and the information is conveyed to registrar 104.

At 804, registrar 104 conveys the data to registry 102 using an EPP command as described above in reference to 704 of FIG. 7.

At 806, registry 102 conveys the information to identity management blockchain 750 as part of a write request. Registry 102 may convey the information in an ordered triple, e.g., (mydomain.tld, MyNetwork, 0x2468). In particular, registry 102 may convey the information to a smart contract on identity management blockchain 750.

At 808, the smart contract writes the association to identity management blockchain 750. Note that method 700, for network identifiers of undefined format, may not include a validation step such as 708 of method 700. Subsequently, the smart contract may return a confirmation of the write, which may be passed back to registrant 202 via registry 102 and registrar 104.

VII. Read Requests

To access the identity management blockchain 750, several systems may be supported. According to some embodiments, software may be provided to allow anyone who wants to maintain a full node on the identity management blockchain 750 network to do so. Maintaining a full node may allow an entity to download and track the entire identity management blockchain 750.

Figure 9:
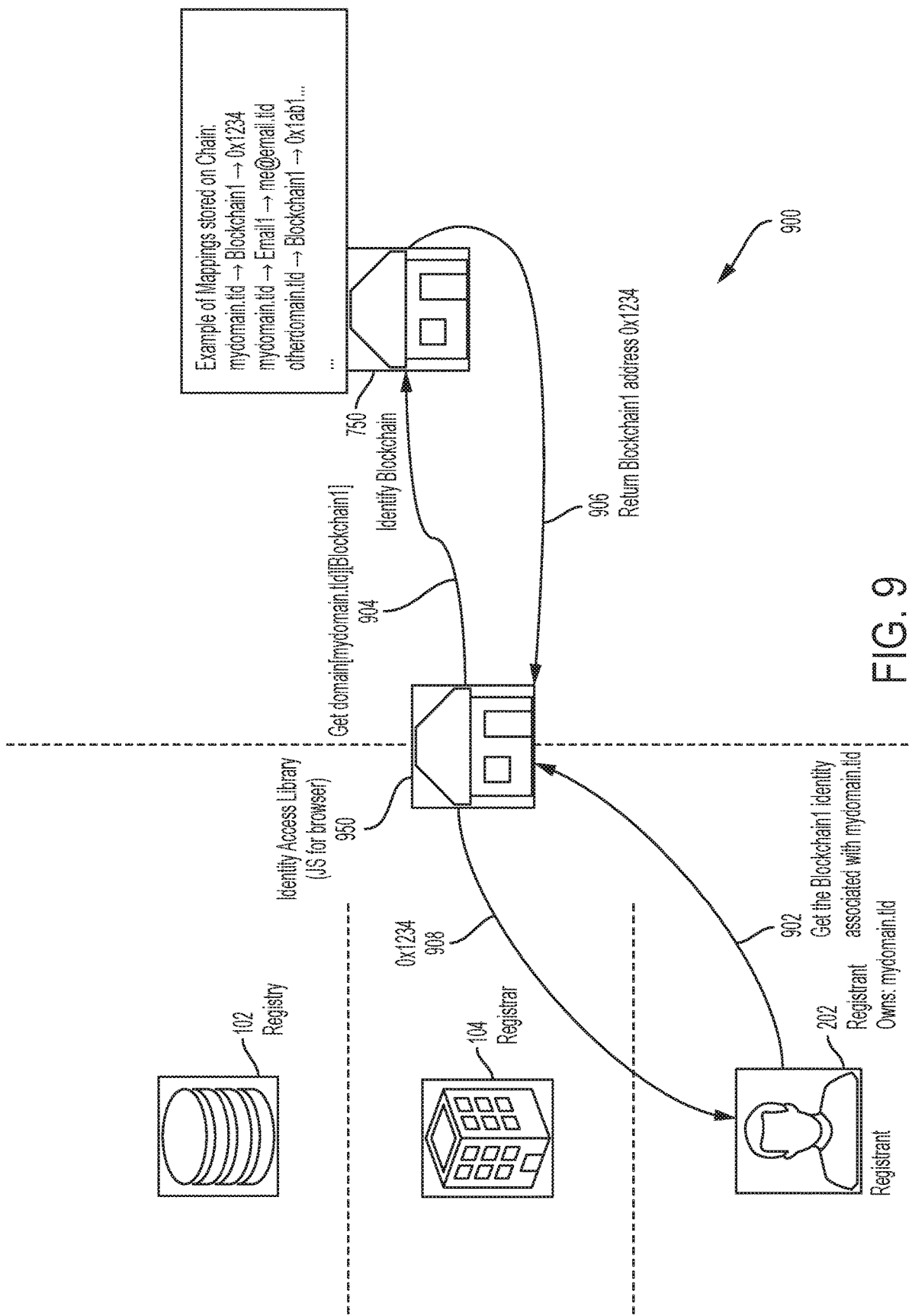
FIG. 9 is a hybrid diagram of a method for responding to a request for an existing record from an identity blockchain according to various embodiments.
Figure 10:
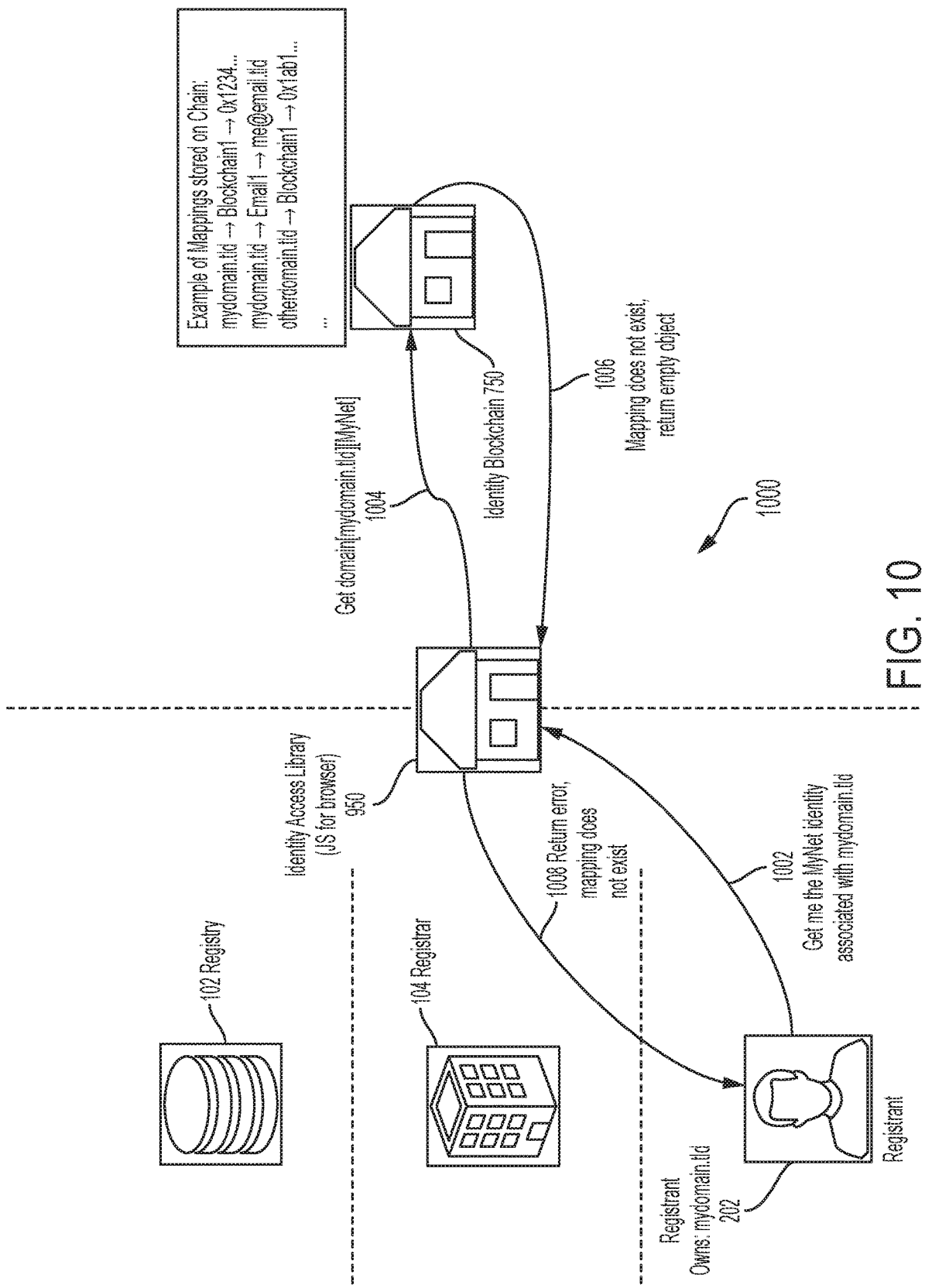
FIG. 10 is a hybrid diagram of a method for responding to a request for a nonexistent record from an identity management blockchain according to various embodiments.

Further, according to some embodiments, software may be provided to allow entities to query identity management blockchain 750 without having to download the entire blockchain. For example, light-weight JavaScript libraries may be provided so that websites can use the JavaScript hooks to query a node on the identity management blockchain 750 network to get requested information. FIGS. 9 and 10 and their description disclose techniques for utilizing such software.

FIG. 9 is a hybrid diagram of a method 900 for responding to a request for an existing record from identity management blockchain 750 according to various embodiments. For convenience, method 900 is described in reference to the same registrant 202 and identity management blockchain 750 as described above in reference to FIG. 7. In general, method 900 may be initiated by a variety of entities using a variety of querying functionality. As shown, registrant 202 initiates method 900 to request a network identifier for the network Blockchain1 associated with the domain name mydomain.tld.

At 902, registrant 202 initiates a request for a network identifier corresponding to mydomain.tld for the network Blockchain1. The request may be made, for example, by registrant 202 requesting an action in any of a variety of user interfaces in any of a variety of fields of endeavor. For example, registrant 202 may utilize a wallet to send cryptocurrency to another user of Blockchain1, and registrant 202 may log in to their wallet by providing the domain name mydomain.tld to the wallet, possibly with a password. The wallet may then initiate the request of 902 to obtain registrant's 202 address for Blockchain1.

At 904, the wallet (or other executable software) utilizes JavaScript library 950 to issue a command to identity management blockchain 750. The command may be a "get" command, to get the network identifier of registrant 202 for Blockchain1. The command may be of the form getNetworkID(Blockchain1, mydomain.tld), for example. The command may be conveyed to the smart contract in identity management blockchain 750 for processing.

At 906, identity management blockchain 750 returns the network identifier associated with mydomain.tld and Blockchain1. The smart contract may receive the command, perform a lookup operation for the provided parameters, retrieve the network identifier, and return the network identifier in response to the command of 904.

At 908, the wallet (or other executable software) receives the response to the JavaScript command, in the illustrated instance, the network identifier 0x1234. The wallet may utilize the network identifier for Blockchain1 to perform a blockchain operation, e.g., sending cryptocurrency to another user of Blockchain1.

Note that, although FIG. 9 depicts a read request in reference to the network Blockchain1, read requests are not so limited. For example, the identity management blockchain may store an association between mydomain.tld and an email address of registrant 202. Registrant 202 may set up an email program and enter their domain name instead of their email address. The email program may fetch the corresponding email address from identity management blockchain 750 to finalize the email account setup.

Note further that, although FIG. 9 depicts a read request sent by the owner of mydomain.tld, requests are not so limited. Any entity may send such a command to determine a network identifier that corresponds to mydomain.tld for Blockchain1.

FIG. 10 is a hybrid diagram of a method 1000 for responding to a request for a nonexistent record from identity management blockchain 750 according to various embodiments. For convenience, method 900 is described in reference to the same registrant 202 and identity management blockchain 750 as described above in reference to FIG. 7. Like method 900, method 900 1000 be initiated by a variety of entities using a variety of querying functionality. As depicted in FIG. 10, registrant 202 initiates method 1000 to request a network identifier for the network MyNet associated with the domain name mydomain.tld.

At 1002, registrant 202 initiates a request for a network identifier corresponding to mydomain.tld for the network MyNet. Like in method 900, the request may be initiated by registrant 202 or any other entity, and may be sent by a wallet or any other executable software. As shown, registrant 202 initiates the request, which includes the parameters MyNet and mydomain.tld.

At 1004, the wallet (or other executable software) utilizes JavaScript library 950 to issue a command to identity management blockchain 750. The command may be of the form getNetworkID(MyNet, mydomain.tld), for example. The command may be conveyed to the smart contract in identity management blockchain 750 for processing.

At 1006, under the continuing premise that no corresponding network identifier exists, identity management blockchain 750 (e.g., by way of the smart contract) performs a lookup function, which does not yield a network identifier. Blockchain 750 therefore returns an empty object or otherwise provides an indication that the requested network identifier was not found.

At 1008, the wallet (or other executable software) receives the response to the JavaScript command, in the illustrated instance, an error message. The wallet (or software) may subsequently display such a message to registrant 202.

VIII. Example Advantages

As presented above, Part B shows and discloses techniques for managing and maintaining a user's various identifiers anchored around a domain name, creating a universal identifier for a user that is centered around the well-known and widely used system of internet domain names. This consolidates both a user's DNS presence and their alternative network identifiers into one single authoritative source. Networks may utilize identity management blockchain 750 to permit a user to log in or otherwise utilize their networks by providing any identifier associated with the user, not limited to the original identifier associated with the user in a particular network. For example, a cryptocurrency blockchain network may utilize a separate identity management blockchain to manage identities of the users of the cryptocurrency network. The cryptocurrency network, e.g., its wallets, may consult the identity management blockchain to retrieve a cryptocurrency blockchain address that corresponds to a network identifier supplied by any entity, e.g., to log in, send cryptocurrency, retrieve cryptocurrency, etc.

Further, the techniques of this Part leverage a blockchain to provide a trustworthy, tamper proof, transparent, and secure system to facilitate adding and tracking identifiers. The inclusion of known network names that provide a strong guarantee of data formatting ensures usability of data added to the identity management blockchain 750.

Yet further, the use of a publicly-readable blockchain may spur adoption of this approach to a universal identifier in a way that a centralized database hidden behind the registry (or other entity) cannot. In particular, the publicly visible nature of the system ensures that external parties can always validate the state of the network. This ensures, for example, they can see when information is changed and how the network evolves, which, in turn, lends to greater trust in the universal identifiers included on the identity management blockchain.

Part C: Subdomain and Path Blockchain Addresses

IX. Overview

This Part elaborates on the discussion of using subdomains for blockchain addresses initiated above in Part A, Section IV(a). More broadly, this Part discloses embodiments that generalize domain names as network identifiers as presented in Part A, above. In particular, embodiments according to this Part establish and utilize network identifiers that include second-level domain names as blockchain addresses. Such network identifiers include subdomains and paths.

For example, a user may register the domain name name.tld in the DNS. The user might wish to have multiple identities on a blockchain network. This may be the case for a cryptocurrency blockchain network, for example, where the user wishes to establish a first identity for personal use, and a second identity for professional use. According to the techniques of this Part, the user may associate the subdomain personal.name.tld with a first address on the cryptocurrency blockchain network, and may associate the subdomain business.name.tld with a second address on the cryptocurrency blockchain network. Likewise, the user may associate the path name.tld/personal with a first address on the cryptocurrency blockchain network, and may associate the path name.tld/business with a second address on the cryptocurrency blockchain network. Embodiments are not limited to cryptocurrency blockchain networks; any blockchain network may benefit from the disclosed techniques.

According to embodiments of this Part, any subdomain or path used as a resolvable blockchain address may also double as a subdomain or URL that is resolved in a traditional browser. For example, name.tld/business may be used as both a web address for an e-commerce website and as a specific blockchain address, e.g., for a blockchain cryptocurrency network for sending and receiving cryptocurrency. Thus, embodiments of this Part provide multiple uses for domain names while retaining their functionality as traditional website addresses.

X. Subdomain Names as Blockchain Addresses

As used herein, the term "second-level domain name" means a domain name that includes both a top-level domain name and a domain name directly below a top-level domain name. For example, example.com is a second-level domain name. Further as used herein, the term "subdomain" means a domain name that includes a top-level domain name, a domain name directly below a top-level domain name, and at least one additional domain name below a domain name directly below a top-level domain name. For example, subdomain.example.com is a subdomain, as is subdomain2.subdomain1.example.com.

Figure 11:
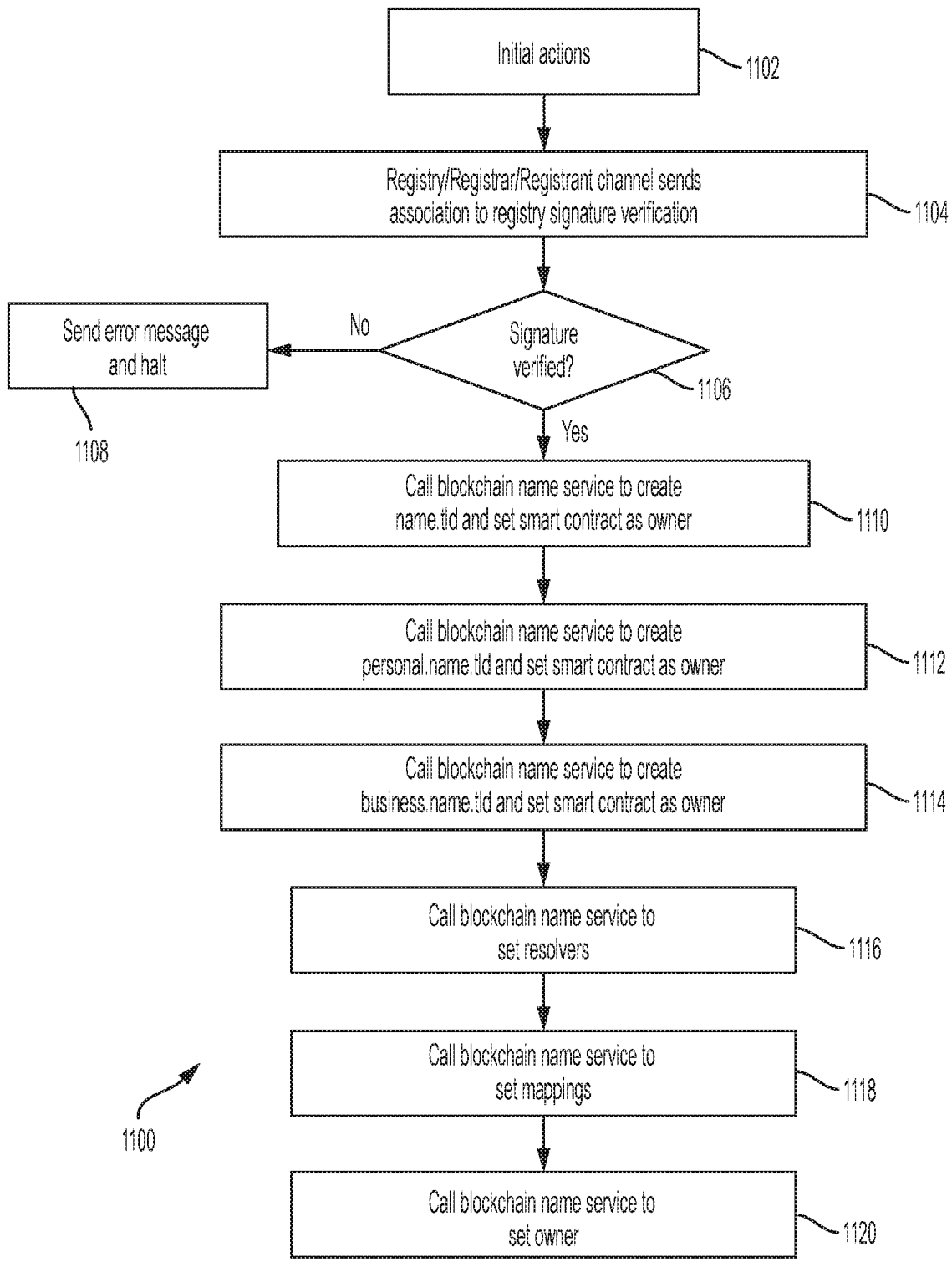
FIG. 11 is a flowchart of a method for assigning subdomains as blockchain addresses according to various embodiments.

FIG. 11 is a flowchart of a method 1100 for assigning subdomains as blockchain addresses according to various embodiments. For convenience, method 1100 is described in reference to the same registry 102, registrar 104, registrant 202, registry signature verification program 106, and blockchain directory 110 as described above in reference to FIG. 2. Method 1100 may be initiated by a registrant, such as registrant 202. The actions performed by registrant 202 in method 1100 may be performed through or by the registrant's wallet according to some embodiments.

By way of non-limiting example, method 1100 is shown and described herein as associating the domain name name.tld with the blockchain address 0x0123, associating the subdomain name personal.name.tld with the blockchain address 0x4567, and associating the subdomain name business.name.tld with the blockchain address 0x8910. However, any second-level domain name and subdomains may be used.

At block 1102, method 1100 performs initial actions. Such initial actions may include setup phase actions as shown and described above in reference to FIG. 1. Further, the initial actions may include execution phase actions as shown and described above in reference to FIGS. 2-5, up to that point at which a registry, registrar, or registrant sends (see, respectively, 216 of FIG. 2, 314 of FIG. 3, and 414 of FIG. 4) the domain name, proof, and existing blockchain address to the registry signature verification program 106. Continuing the example under discussion, such actions may be done for the example domain name name.tld and existing blockchain address of 0x0123 consistent with the present description of method 1100. Thus, at the end of the initial steps, a respective registry, registrar, or registrant has possession of a registrar of record proof for the domain name name.tld.

At block 1104, a respective registry, registrar, or registrant sends association information to the registry signature verification program 106. The association information for the example under discussion may be in the form of a list of ordered pairs, such as ([name.tld, 0x0123], [personal.name.tld, 0x4567], [business.name.tld, 0x8910]). The association information may include, or be accompanied by, the registrar of record proof obtained in the initial actions 1102.

According to various embodiments, the actions of blocks 1106, 1108, 1110, 1112, 1114, 1116, 1118, and 1120 may be performed by the registry signature verification program 106. According to various embodiments, some of the actions of these blocks (e.g., verifying the registry's signature) may be performed by registry signature verification program 106, and other actions may be performed by a separate smart contract (e.g., a blockchain directory smart contract such as blockchain directory 110) present on the blockchain. Thus, for the remainder of the description of method 1100, the actions are described as being performed by a blockchain smart contract, which may be registry signature verification program 106, blockchain directory 110, and/or another smart contract on the blockchain.

At block 1106, the registry signature verification program 106 attempts to verify the registrar of record proof. If registry signature verification program 106 successfully verifies the registry's signature, then method 1100 proceeds to block 1110. Otherwise, at block 1108, registry signature verification program 106 may return an error message, which may be conveyed back to registrant 202, and method 1100 may halt.

At block 1110, the blockchain smart contract calls the blockchain name services program to generate a record for the domain name name.tld. The blockchain name services program may further set the owner of name.tld as the blockchain address of the blockchain smart contract as part of this block. According to some embodiments, only the owner as listed in the blockchain name services program may make changes to the corresponding domain name record. Thus, the actions of blocks 1110, 1112, 1114, 1116, 1118, and 1120 may be performed in a single blockchain transaction according to some embodiments.

At block 1112, the blockchain smart contract calls the blockchain name services program to generate a record for the domain name personal.name.tld and set the owner of personal.name.tld as the blockchain smart contract in the blockchain name service.

At block 1114, the blockchain smart contract calls the blockchain name services program to generate a record for the domain name business.name.tld and set, in the blockchain name service, the owner of business.name.tld as the blockchain smart contract.

At block 1116, the blockchain smart contract calls the blockchain name services program to specify that blockchain directory 110 stores the associations of name.tld, personal.name.tld, and business.name.tld to their respective blockchain addresses. That is, the blockchain smart contract requests that the blockchain name services program store the blockchain address of the smart contract that maps the domain names of this example to their respective blockchain addresses. Alternately, if a different resolver than blockchain directory 110 is to be used to store such associations, the blockchain smart contract calls the blockchain name services program to store an indication of the same.

At block 1118, the blockchain smart contract calls the blockchain name services program to set the associations of the domain name and subdomains in the continuing non-limiting example to their respective blockchain addresses. The blockchain smart contact may convey the associations in the form of a list of ordered pairs, e.g., ([name.tld, 0x0123], [personal.name.tld, 0x4567], [business.name.tld, 0x8910]).

At block 1120, the blockchain smart contract calls the blockchain name services program to set the owner of the domain name and subdomains appropriately. This may include setting the owner as the blockchain address associated with the domain name, name.tld, which is 0x0123 in this example. Any other blockchain address may be used, e.g., as specified by registrant 202 at the initiation of method 1100. Alternately, according to some embodiments, the owner may remain as the blockchain smart contract per block 1110.

After block 1120, method 1100 may conclude.

Once the subdomains are associated with blockchain addresses per method 1100, a wallet (or other any other executable software that can interact with the blockchain network) may retrieve a blockchain address associated with a given subdomain by sending a request to blockchain directory 110. Alternately, if a the address of a resolver other than blockchain directory 110 was stored at the blockchain name services program per block 1116 above, then the wallet or other executable software may retrieve the blockchain address by sending a request thereto. In either case, the wallet or other executable software may discover the blockchain address of the blockchain directory 110 (or alternative resolver) by sending a query to the blockchain name services program, requesting the resolver address of the subdomain.

XI. Adding Subdomains

Once one or more subdomains have been assigned as blockchain addresses, registrant 202 may wish to add additional subdomains and associated blockchain addresses. Continuing the example of FIG. 11, the user may wish to assign education.name.tld as a blockchain address, in addition to the already-established personal.name.tld and business.name.tld.

However, according to some embodiments, some blockchain networks only allow entities that are listed as the owner of a domain name in the blockchain name service to add new subdomains as blockchain addresses. For example, if registrant 202 wants to add education.name.tld after performing method 1100 using the data in the presented example, then registrant 202, which is listed as the owner of name.tld in the blockchain name service per block 1120, is the authorized entity to set this up, rather than the blockchain smart contract. This section provides example embodiments that may be used to work around this issue.

To add a subdomain, some embodiments use the blockchain smart contract to temporarily assign ownership, per the blockchain name service, of the second-level domain name, in this example name.tld, back to registry signature verification program 106. Note that registry signature verification program 106 owns one or more top-level domain names in the blockchain transaction ownership sense as described above in reference to FIG. 1. Thus, registry signature verification program 106 has the authority to add any second-level domain, or any subdomain, that is under the registered top-level domain. Thus, some embodiments may use registry signature verification program 106 to add a subdomain and then transfer ownership back to the original owner of the domain name in the blockchain name service. All of the actions recited in this paragraph may be performed in a single atomic transaction in the blockchain.

Alternatively, to add a subdomain, some embodiments utilize deed contracts, a type of smart contract. According to such embodiments, program instructions for modifying a domain name in the blockchain name services program are included in a deed contract in the blockchain. Further, the deed contract is set as the owner of the domain name in the blockchain name services program. In addition, the deed contract itself is configured to specify registrant 202 as the owner of the deed, and to specify registry signature verification program 106 as a party that can execute update operations for the domain name. For embodiments according to this paragraph, each domain name may have an associated deed contract. Registrant 202 may interact with the deed contract using a decentralized application (DApp) that registry signature verification program 106 runs that provides a user interface for interacting with the deed contract.

Alternatively, to add a subdomain, some embodiments permit a user-driven process. According to such embodiments, registry signature verification program 106 provisions the second-level domain name (name.tld according to the example of this Part) and then registry 102 and/or registrar 104 provides instructions on how to set up additional subdomains.

XII. Path Names as Blockchain Addresses

As used herein, the term "path" means a domain name concatenated with a string that indicates a location of a file.

For example, name.tld/business is a path. As another example, example.com/path1/path2 is a path.

According to various embodiments, a registrant such as registrant 202 may associate paths with blockchain addresses, so that paths may be used as blockchain addresses. This is beneficial at least because registrant 202 may use their subdomains as they see fit, while still being able to specialize their domain name for blockchain address purposes.

According to various embodiments for this section, a registrant may initiate a method similar to method 1100 of FIG. 11, except instead of associating subdomains, the method associates paths. The method of establishing the association is essentially identical to method 1100, except for the substitution of paths for domain names, and, as detailed below, except for where the associations may be stored.

In usage, a wallet (or any decentralized application) may take path input, e.g., name.tld/personal, and internally parse it into an ordered pair, e.g., (name.tld, personal), as the discrete inputs that are sent to registry signature verification program 106 or blockchain directory 110 for resolution, that is, in order to obtain the associated blockchain address. Note that for usage, a wallet or decentralized application may include two separate logical flows for determining blockchain addresses associated with input domain names. A first logical flow may be implemented for domain names that lack a "/" character. Such a logical flow may resolve the domain name using the techniques of, e.g., Part A, above. A second logical flow may be implemented for domain names that include a "/" character. Such a logical flow may resolve the input path by retrieving the associated blockchain address from its storage location.

According to embodiments of this section, the associations of paths to blockchain addresses may be stored in either registry signature verification program 106 or blockchain directory 110 according to various embodiments. Both options have associated advantages.

Advantages of storing the associations in registry signature verification program 106 include that such an approach avoids the need to transfer ownership of the path in order to make modifications. That is, according to such embodiments, registry signature verification program 106 may have direct access to modify path-based associations, without needing to interact with any blockchain name services program. Thus, such embodiments provide a smooth experience for registrant 202 because additions and deletions may be made through registry 102 or registrar 104.

Advantages of storing the associations in blockchain directory 110 include that such an approach ensures centralization of name-based associations.

Once path-to-blockchain-user-address associations are implemented, a technique such as that shown and described below in reference to FIG. 12 may be implemented in order to resolve such paths to blockchain addresses.

Figure 12:
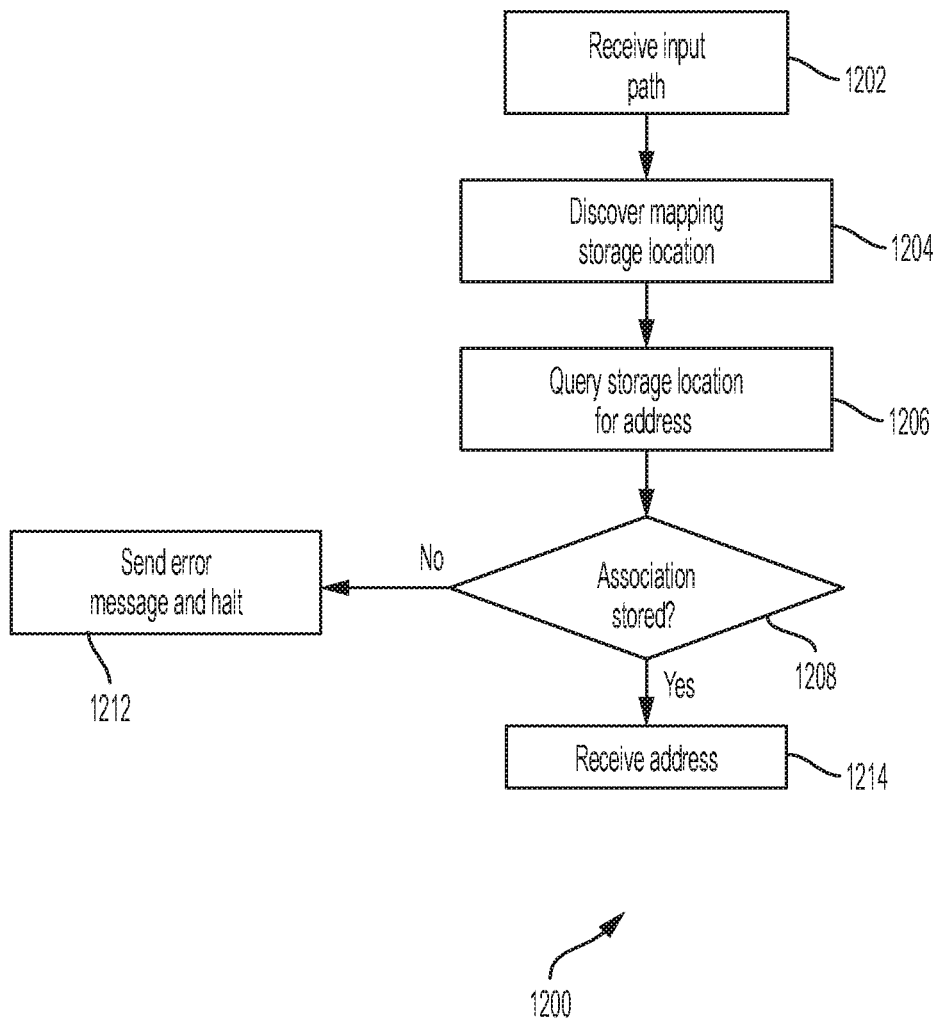
FIG. 12 is a flowchart of a method for resolving paths as blockchain addresses according to various embodiments.

FIG. 12 is a flowchart of a method 1200 for resolving paths as blockchain addresses according to various embodiments. For convenience, method 1200 is described in reference to the same registry 102, registrar 104, registrant 202, registry signature verification program 106, and blockchain directory 110 as described above in reference to FIG. 2. Method 1200 may be performed through or by a registrant's wallet according to various embodiments.

At block 1202, an application, such as a wallet or decentralized application, receives as an input a path. By way of non-limiting example, such a path may be name.tld/business. The wallet or decentralized application may receive the path from a user manually entering it into a field, or from a separate application, for example.

At block 1204, the wallet or decentralized application discovers the storage location of the association of the path provided per block 1202 to a blockchain address. To do so, it may send a request message to the name services program for the respective blockchain. The message may include the path. In response, the name services program provides the blockchain address for the storage location of the association.

At block 1206, if the wallet or decentralized application sends a query to the blockchain address of the storage location provided at block 1204. Per example embodiments of this Part, the address may be for registry signature verification program 106 or blockchain directory 110.

At block 1208, if the association is not stored in the location queried per block 1206, then control passes to block 1212, where an error message is displayed to the end user, and method 1200 halts. Otherwise, control passes to block 1214.

At block 1214, the wallet or decentralized application receives the blockchain address associated with the path of block 1202. Thereafter, the wallet or decentralized application may utilize the blockchain address for any purpose.

XIII. User Interfaces

This section presents example user interfaces suitable for use with embodiments of this Part as well as certain embodiments of other Parts.

FIG. 13 depicts a user interface 1300 for managing identifiers that include domain names as blockchain addresses according to various embodiments. User interface 1300 may be present on a website according to some embodiments. The website may require a username and password to be entered before presenting user interface 1300. User interface 1300 includes a field 1302 into which a user, such as registrant 202, may enter a domain name to be managed. User interface 1300 further includes a table into which the user may add or remove rows. Each row includes a field 1304 into which the user may enter an identifier, as illustrated, a path, that includes the domain name entered into field 1302. Each row also includes drop-down menu 1306, from which the user may select a blockchain network, where the identifier of field 1304 is used as a blockchain address of the selected blockchain network. Each row further includes a field 1308 into which the user may enter a blockchain address to associate with the identifier entered into field 1304. Each row further includes a field that displays a status of the identifier of field 1304, namely, whether such identifier is currently associated with the blockchain address of field 1308 in the blockchain network of field 1306. Finally, each row includes a field 1312 that allows the user to remove the row. According to some embodiments, removing the row causes the removal of the association between the identifier and the blockchain address. User interface 1300 also includes button 1314 that the user can activate to add a row to the table, which allows the user to add a new association. Button 1316, when activated, may initiate any of methods 200, 300, 400, 500, or 1100.

Figure 14:
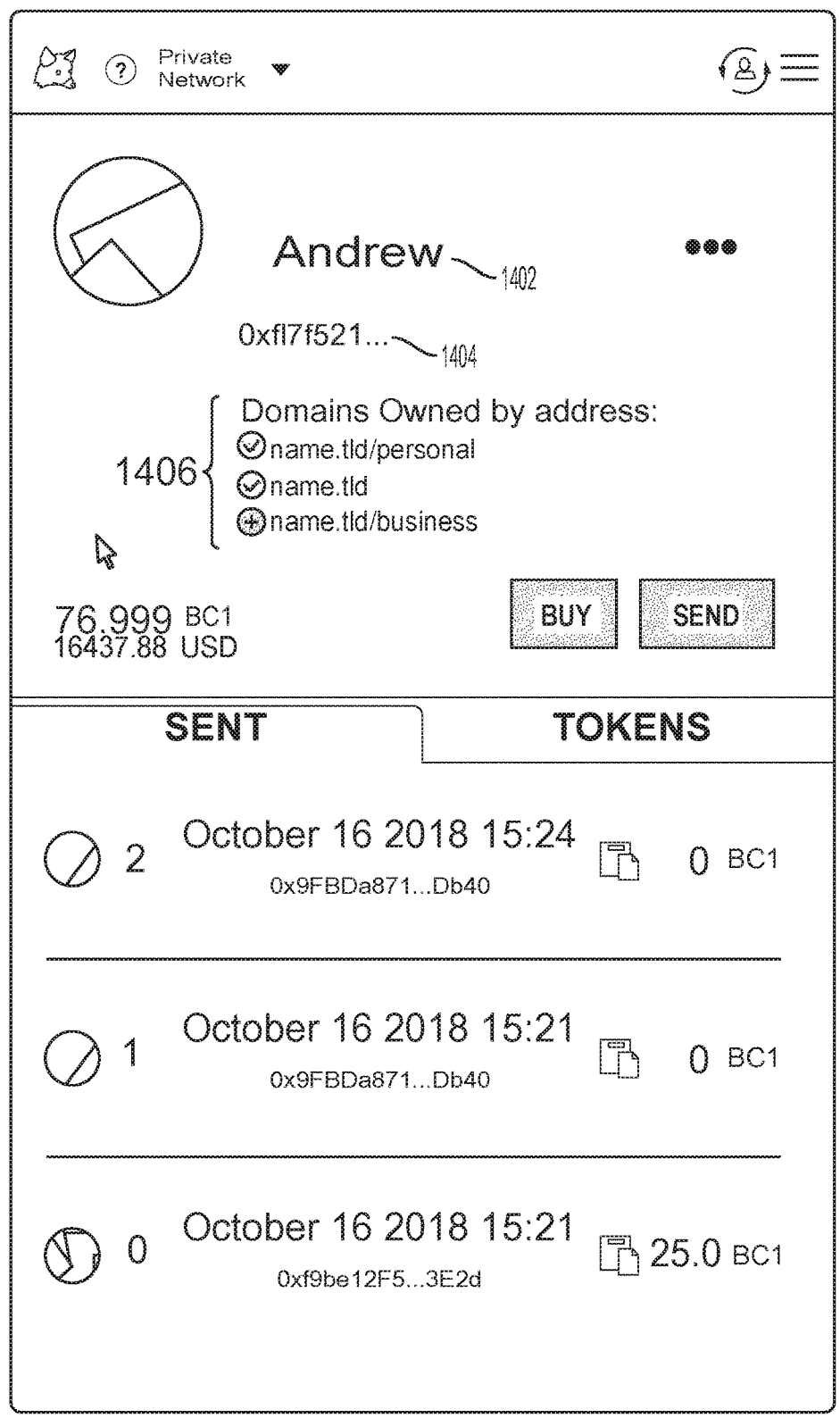
FIG. 14 depicts a wallet user interface for claiming identifiers that include domain names according to various embodiments.

FIG. 14 depicts a wallet user interface 1400 for claiming identifiers that include domain names according to various embodiments. The information displayed in user interface 1400 is for a particular cryptocurrency network, denoted here as "BC1". User interface 1400 displays the name 1402 of the wallet owner. User interface 1400 also displays the blockchain address 1404 for the user on BC1. User interface 1400 further displays the domain names associated with blockchain address 1404. Names with a check mark next to them correspond to names that have been claimed through the wallet. Names without the check mark, but with an add symbol (here, a plus sign in a circle) have been pushed to the blockchain network, but not yet claimed through the wallet. The user may click on the add symbol to claim the latter such domain names. User interface 1400 also displays standard cryptocurrency wallet features, such as cash and cryptocurrency balances, records of cryptocurrency sent, to which entity, and when, and buttons to active cryptocurrency purchase and sending operations.

Figure 15:
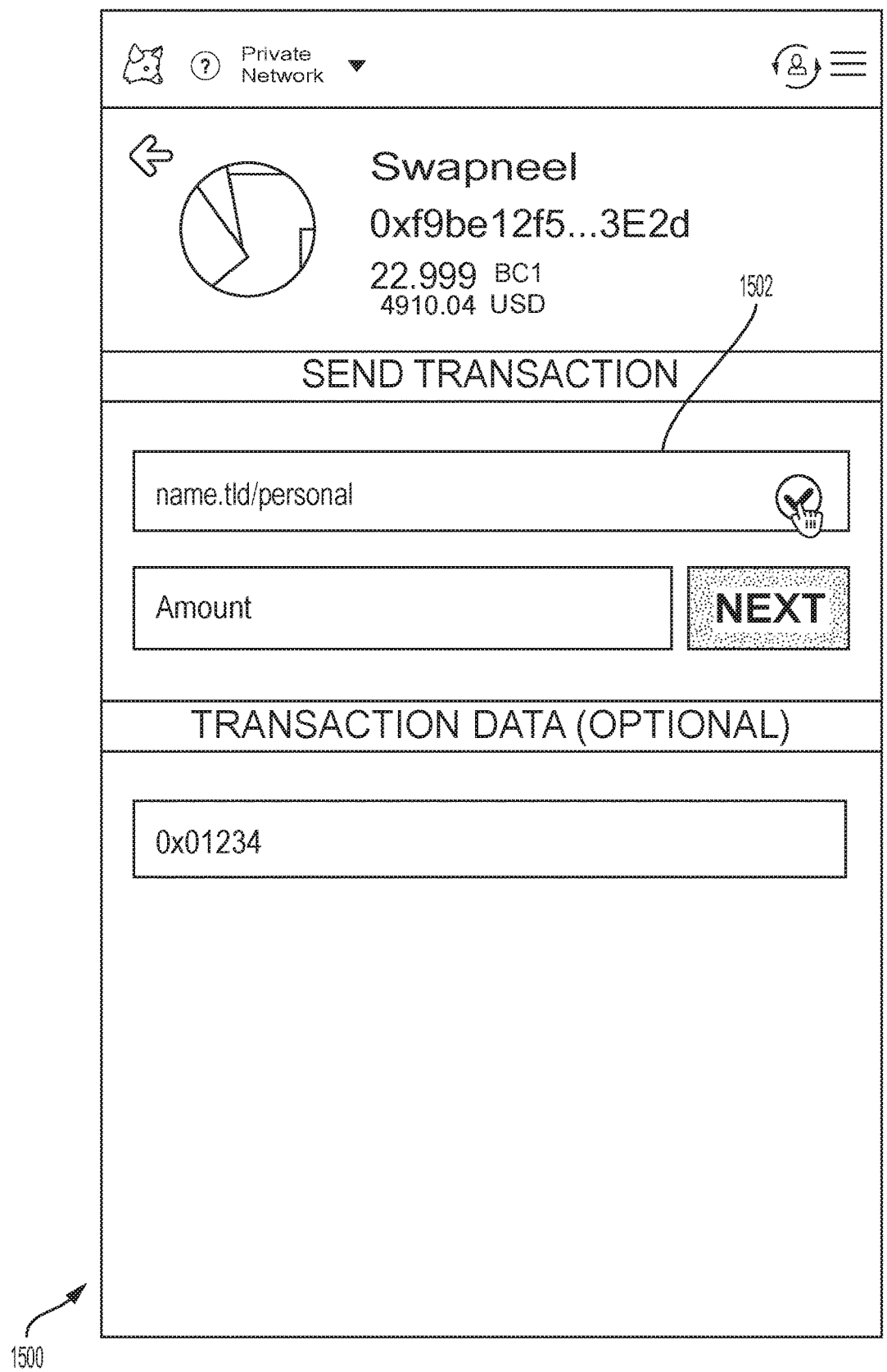
FIG. 15 depicts a wallet user interface for sending cryptocurrency using a path as a recipient blockchain address according to various embodiments.

FIG. 15 depicts a wallet user interface 1500 for sending cryptocurrency using a path as a recipient blockchain address according to various embodiments. As shown interface 1500 includes a field 1502 into which a sending user may enter an identifier of a receiving user. As illustrated, a path, name.tld/personal that includes the domain name name.tld is used as a blockchain address for the recipient of cryptocurrency.

Part D: DNS-Stored Blockchain Address Information Concerning Associations of Domain Names to Blockchain Addresses

XIV. Overview

This Part discloses establishment and usage of information stored in the DNS concerning domain names used as blockchain addresses. Such DNS-stored blockchain information can bring increased trust in domain names as used for blockchain addresses. The DNS-stored blockchain information may be stored in custom DNS TXT resource records or in new DNS resource record type(s). The DNS-stored blockchain information can range in scope about what it attests to and is not limited to one discrete fact per DNS resource record. The DNS-stored blockchain information for a particular domain-name-to-blockchain-user-address association may include, by way of non-limiting example:

The location (e.g., smart contract) on the blockchain that is authoritative for the domain name, i.e., that stores the blockchain address for the resolver for the domain name;

The location on the blockchain that can resolve (i.e., determine a blockchain address associated with) the domain name;

The blockchain address that this domain name should map to for the blockchain; or The blockchain account that is the owner of the domain name for the blockchain as listed in the blockchain name service.

Note that the above example types of DNS-stored blockchain information are all in the form of blockchain addresses. Accordingly, such DNS-stored blockchain information may be characterized as DNS-stored blockchain address information concerning associations of domain names to blockchain addresses. Any, or any combination of the above types of DNS-stored blockchain information, may be utilized by various embodiments.

The DNS-stored blockchain address information concerning domain names used as blockchain addresses can be used for multiple purposes, ranging from safeguarding to bootstrapping. Using such DNS-stored blockchain address information as a safeguard treats it as a second factor, e.g., to confirm that data regarding the domain-name-to-blockchain-user-address association retrieved from other sources is accurate. Using such DNS-stored blockchain address information for bootstrapping permits users to determine pertinent details about how a domain name is associated with a blockchain address on a given blockchain. These and other features and advantages are presented in detail below.

XV. Setup

Figure 16:
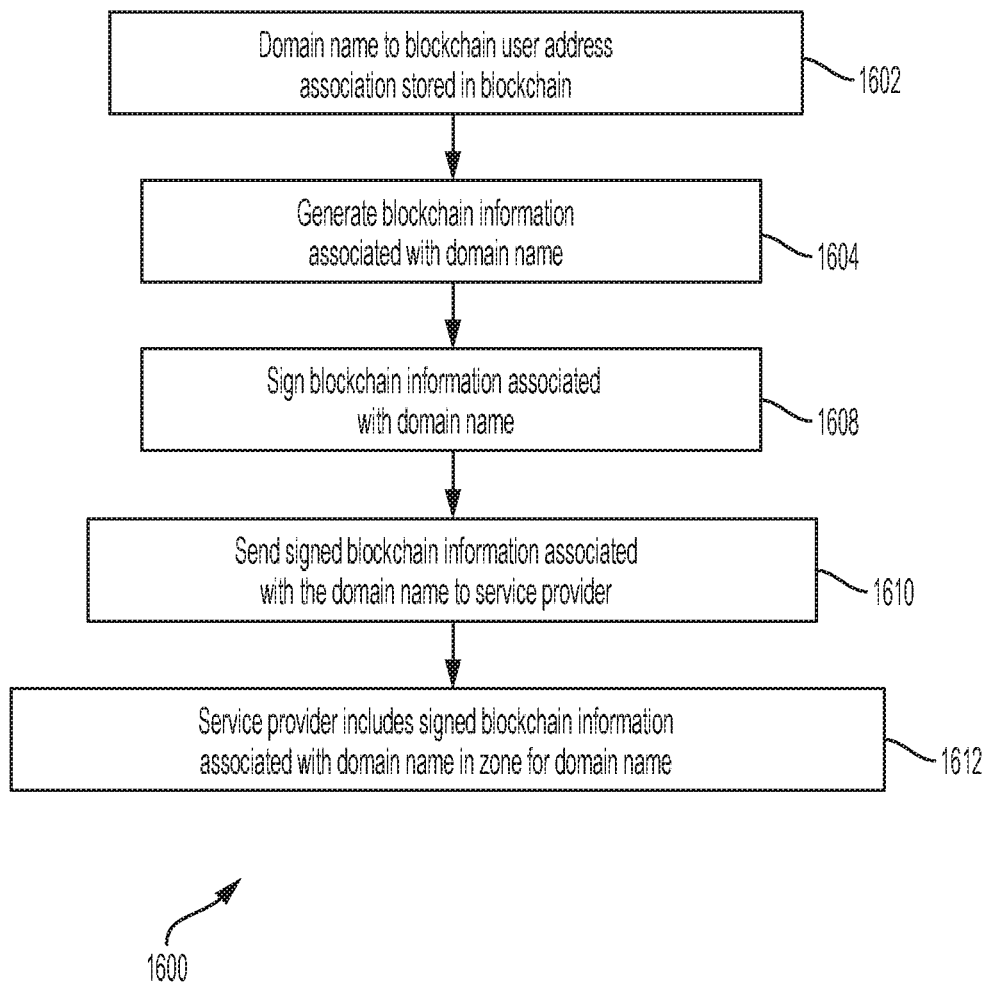
FIG. 16 is a flowchart of a method for storing in the DNS blockchain address information concerning associations of domain names to blockchain addresses.

FIG. 16 is a flowchart of a method for storing in the DNS blockchain address information concerning associations of domain names to blockchain addresses. For convenience, method 1600 is described in reference to the same registry 102, registrar 104, registrant 202, registry signature verification program 106, and blockchain directory 110 as described above in reference to FIG. 2. Method 1600 may be performed through or by a registrant's wallet according to various embodiments.

At block 1602, data associating a domain name to a blockchain address is stored in the respective blockchain. The actions of this block can be performed using any of methods 200, 300, 400, 500, or 1100, for example. Registrant 202 of a domain name, e.g., name.tld, thus associates the domain name to the blockchain address, e.g., 0x1234, of registrant 202, such that registrant 202, as well as other participants in the blockchain network, may use name.tld as the blockchain address of registrant 202. Note that the actions of this block may be initiated by registrant 202 via a wallet, for example.

At block 1604, blockchain address information concerning the association of the domain name (continuing the example, name.tld) to the blockchain address (for this example, 0x1234) is generated. Such blockchain address information may include, for example, any, or any combination, of: the blockchain address for the smart contract that identifies the resolver for name.tld (i.e., the name services blockchain address), the blockchain address for the smart contract that can resolve name.tld (i.e., the resolver blockchain address), the blockchain address associated with name.tld for the blockchain (i.e., the blockchain address), or the blockchain address that is the owner of name.tld for the blockchain as identified in a name service for the blockchain (i.e., the owner blockchain address). The wallet or other executable program may generate such information.

Further as part of block 1604, the wallet or other executable program may format the blockchain address information so as to include other relevant information. Such other relevant information may include, by way of non-limiting example, an identification of the blockchain. Alternately, or in addition, such relevant information may include the type of information (e.g., the name services blockchain address, the resolver blockchain address, the blockchain address, or the owner blockchain address).

At block 1608, the wallet or other executable program generates a digital signature on all or part of the blockchain address information of blocks 1602 and 1604. That is, the signature may be generated for all, or any portion, of: the identity of the blockchain, the type of information, or the actual value for the information (e.g., a blockchain address). The wallet of registrant 202 may utilize the blockchain private key of registrant 202 to generate the signature. Thus, the actions of this block generate a data structure that includes the blockchain address information and a signature on all or part of the information.

The usage of digital signatures as disclosed permits entities to trust the information. In a worst-case scenario, the DNS zone file could be maliciously compromised and filled with malicious information. This would result in mismatches between the blockchain information and the blockchain reality, which could be deleterious depending on how the information were utilized by the blockchain clients. The usage of signatures as disclosed helps safeguard against this type of threat.

At block 1610, the wallet or other executable program sends the product of block 1606 to registrar 104 or any DNS service provider.

At block 1612, registrar 104 (or a respective service provider) includes the blockchain address information and its signature as a DNS record in the domain name's DNS zone, e.g. in a TXT or other DNS resource record. Thus, block 1612 institutes the DNS-stored blockchain address information concerning associations of domain names to blockchain addresses.

Method 1600 may terminate after block 1612.

XVI. Usage

Figure 17:
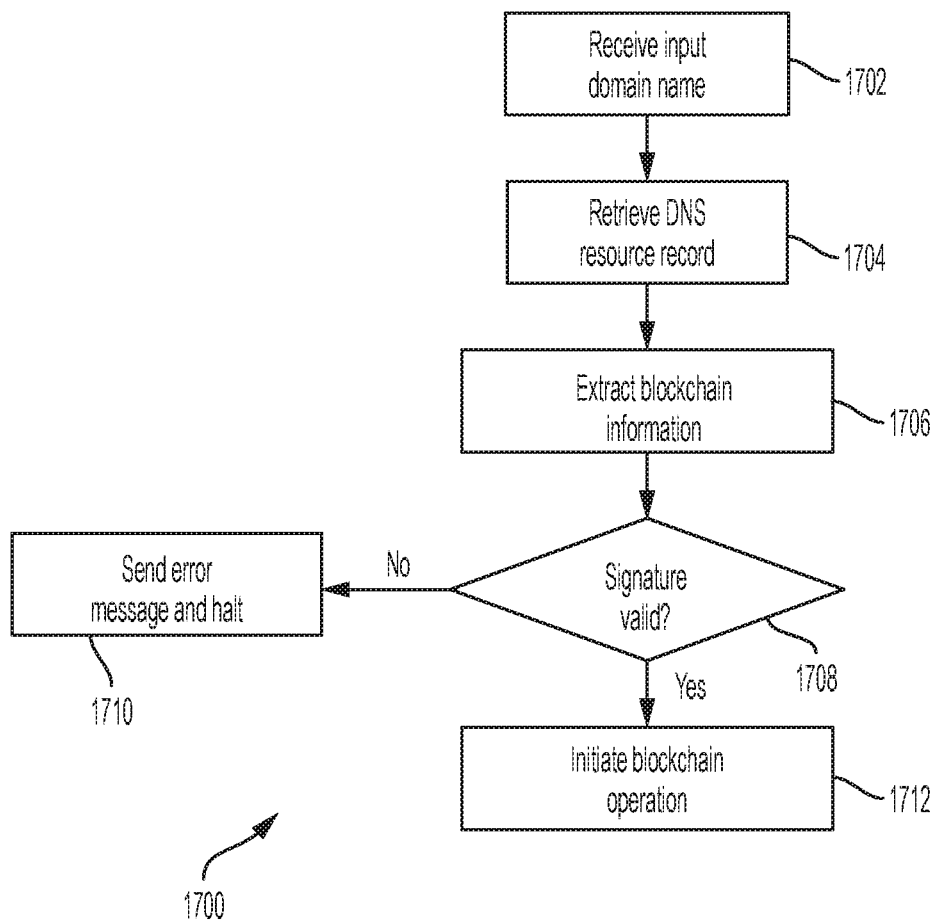
FIG. 17 is a flowchart of a method of using DNS-stored blockchain address information concerning associations of domain names to blockchain addresses.

FIG. 17 is a flowchart of a method 1700 of using DNS-stored blockchain address information concerning associations of domain names to blockchain addresses. For convenience, method 1700 is described in reference to the same registry 102, registrar 104, registrant 202, registry signature verification program 106, and blockchain directory 110 as described above in reference to FIG. 2. Further, method 1700 is described as continuing the example set forth above in reference to method 1600. That is, registrant 202 has associated the domain name name.tld to the blockchain address of 0x1234 in a particular blockchain network.

Method 1700 may be performed by any of a variety of entities, including by way of non-limiting example, the wallet of registrant 202, the wallet of any other participant in the blockchain network, a blockchain client, a decentralized application, or a blockchain node. For convenience of discussion rather than limitation, method 1700 is described as being performed by a wallet of a participant in the blockchain network, e.g., as an initial part of a process for sending cryptocurrency to registrant 202 using name.tld as the blockchain address of registrant 202. In general, method 1700 may be performed as initial verification actions when a blockchain transaction is initiated. In such instances, method 1700 may be performed automatically without being specifically called by the initiator of the transaction.

At block 1702, the participant's wallet receives as an input a domain name. In the continuing example under discussion, the domain name is name.tld. The domain name may be entered in a field in the participant's wallet as a destination for cryptocurrency (see FIG. 15, for example).

At block 1706, the participant's wallet extracts blockchain address information from a DNS resource record. The actions of this block retrieve the blockchain address information stored in the DNS resource record for the DNS zone of the domain name per method 1600. The participant's wallet may utilize standard DNS communication techniques, e.g., User Datagram Protocol (UDP) to do so.

At block 1708, the participant's wallet attempts to verify the signature. To do so, the participant's wallet retrieves the public key of registrant 202. According to some embodiments, the participant's wallet may retrieve the key from the blockchain using a name service for the blockchain. According to some embodiments, the public key may be extracted from the signature itself. (Note that some blockchains provide support for clients to extract blockchain addresses from signatures.) If the signature is invalid, then control passes to block 1710, at which an error message may be displayed in the participant's wallet, and method 1700 may halt. Otherwise, if the signature is valid, control passes to block 1712.

According to some embodiments, the actions of block 1708 may establish that the owner of name.tld as represented in the name service for the blockchain is the entity that provided the information records in the zone file.

At block 1712, the participant's wallet initiates a blockchain action based on the blockchain address information in the resource record. The blockchain action may be any of a variety actions, and the information may be used in any of a variety of capacities to assist in performing the action. Non-limiting example blockchain actions include sending cryptocurrency, receiving cryptocurrency, writing to the blockchain, or reading a portion of the blockchain. Non-limiting example uses for the information to assist in the blockchain action are described presently.

For blockchains that have existing name services, the blockchain address information may be used to provide a second factor to any response. For example, if the existing name services states that 0x5678 is the owner of name.tld, but the blockchain address information states that 0x1234 is the owner, then the participant's wallet may display a message to that effect and recommend that the participant proceed with caution. Similarly, the participant's wallet can check that the resolver location according to the blockchain address information and the resolver location as listed in the name services match. If they do not, the participant's wallet may display a message to that effect and recommend that the participant proceed with caution. If trust is strong in the system, then the information may be used as a shortcut to directly reach, e.g., a resolver or owner.

Some blockchains may have competing name services. For such blockchains, the blockchain address information may be used to identify the correct name service.

Some blockchains lack existing name services. For such blockchains, the blockchain address information may be used to identify a blockchain address that hosts the association of the domain name name.tld to the blockchain address 0x1234.

The participant may not run a full blockchain node and therefore not have a copy of the domain-name-to-blockchain-address associations. Such a participant may rely on an intermediary to retrieve the associations. However, such an intermediary may behave maliciously. For example, the participant may wish to send cryptocurrency to registrant 202 using name.tld, but the intermediary may return 0x5678 as the associated blockchain address instead of the correct 0x1234 blockchain address. Thus, the participant's wallet may compare the blockchain address retrieved from the DNS-stored blockchain address information to the blockchain address identified by the intermediary. If they do not match, then the wallet may display an error message and halt the transaction.

The above use cases for the blockchain address information retrieved from a DNS resource record illustrate how such information may be used in a variety of capacities that exist on a continuum between safeguard and bootstrapping. The usage may depend in part on the trust that a specific name service is valid for a given blockchain. For example, well-known blockchains may have well-known and trustworthy name services. Conversely, for less well-known blockchains with less well-known name, the blockchain address information may be used to bootstrap the participant to identify information about how the domain name is managed on the blockchain.

Section XVII. Alternative Signatures

This section describes how signatures on the blockchain address information stored in the DNS concerning domain names used as blockchain addresses may be implemented in cases where a private key of the domain name's owner cannot be used to sign such information directly. Such cases may arise, for example, when a smart contract is the owner of a domain as listed in the name service for the blockchain.

In such cases, embodiments may provide a standard endpoint to specify one or more entities that are authorized to provide signatures per block 1608 of method 1600. The public keys of such entities may be used to verify signatures per block 1708 of method 1700. The end point may be capable of receiving query messages requesting contact information (e.g., domain names) for such entities, as well as responding to such messages by providing a list of contact information for one or more such entities back to the querier, e.g., using a REST interface. According to various embodiments, a name service may include such an end point. Alternately, or in addition, a smart contract that is listed in the name service as an owner of a domain name may include such an end point. Alternately, or in addition, registry 102 and/or registrar 104 may provide such an end point. For such an end point at registry 102, the list may be communicated using EPP.

Once a querier, such as a wallet, receives a list of contact information for such entities, it may use such information to both convey blockchain address information to an entity for signing, and to retrieve a copy of the entity's public key for validating an existing signature.

Part E: Combinations of Embodiments from Parts A, B, C, and D

Embodiments as disclosed in Parts A, B, C, and D may be combined in any of a variety of ways. For example, a registrant may use the techniques of Part A to associate a domain name to a blockchain address in a first blockchain network and use the techniques of Part C to associate a subdomain of the domain name to a blockchain address in a second blockchain network. The registrant may record such associations in an identity management blockchain using the techniques of Part B. Subsequently, a participant in either blockchain network may use the techniques of Part D to discover and/or verify the associations in order to send or receive cryptocurrency to the registrant.

In addition, some embodiments provide advantages and benefits as follows. Some embodiments, e.g., as disclosed in Part B, prevent fraud by tying multiple identifiers together anchored via a domain name. Such embodiments enhance trust with unknown parties because such parties can consult the identity management blockchain, a DNS assertion per Part D, and information anchored to the domain to validate a user. Further, some embodiments, e.g., as disclosed in Part B, allow users to unify and control their identities at a centralized location and track their authorizations to third parties. Yet further, some embodiments permit a third party, such as a social network, to validate that a user controls a domain name (or subdomain or path) and can therefore be allowed to claim that domain name (or subdomain or path) as an identifier on the third party's platform, e.g., @mydomain.tld on the social network.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A non-transitory computer readable media comprising computer readable instructions that configure a computer associated with a blockchain to utilize blockchain address information concerning associations of domain names to blockchain addresses by performing operations comprising:
   receiving a domain name;
   retrieving, over an internet, a Domain Name System (DNS) resource record for the domain name from a DNS zone;
   extracting a blockchain address information associated with the domain name from the DNS resource record, wherein the blockchain address information is signed with a digital signature of a DNS participant; and
   initiating a blockchain action based on the blockchain address information;
   wherein the blockchain address information comprises a blockchain address for a blockchain directory that includes an entry associating the domain name with a blockchain address corresponding to the domain name,
   wherein the digital signature comprises a signature by a private key of a blockchain key pair,
   wherein the DNS participant comprises a registrant of the domain name.

2. The computer readable media of claim 1, wherein the blockchain address information comprises the blockchain address corresponding to the domain name.

3. The computer readable media of claim 1, wherein the operations further comprise:
   extracting a first blockchain address from the blockchain based on the domain name; deriving a second blockchain address from the blockchain address information; and alerting a user of the computer that the first blockchain address does not match the second blockchain address.

4. The computer readable media of claim 1, the operations further comprising: obtaining an identification of a signer of the blockchain address information from the blockchain.

5. The computer readable media of claim 4, wherein the obtaining the identification of the signer of the blockchain address information from the blockchain comprises obtaining the identification of the signer of the blockchain address information from the blockchain directory.

6. The computer readable media of claim 1, wherein the blockchain action comprises submitting a transaction for recordation in the blockchain.

7. The computer readable media of claim 1, wherein the computer comprises a blockchain node.

8. The computer readable media of claim 1, wherein the computer comprises a blockchain wallet.

9. The computer readable media of claim 1, the operations further comprising:
   validating the digital signature of the DNS participant.

10. A method of utilizing DNS-stored blockchain address information concerning associations of domain names to blockchain addresses for a blockchain, the method comprising:
   receiving a domain name;
   retrieving over an Internet a Domain Name System (DNS) resource record for the domain name from a DNS zone;
   extracting a blockchain address information associated with the domain name from the DNS resource record, wherein the blockchain address information is signed with a digital signature of a DNS participant; and
   initiating a blockchain action based on the blockchain address information;
   wherein the blockchain address information comprises a blockchain address for a blockchain directory that includes an entry associating the domain name with a blockchain address corresponding to the domain name, wherein the digital signature comprises a signature by a private key of a blockchain key pair,
   wherein the DNS participant comprises a registrant of the domain name.

11. The method of claim 10, wherein the blockchain address information comprises the blockchain address corresponding to the domain name.

12. The method of claim 10, further comprising:
   extracting a first blockchain address from the blockchain based on the domain name; deriving a second blockchain address from the blockchain address information; and alerting a user of a computer that the first blockchain address does not match the second blockchain address.

13. The method of claim 10, further comprising obtaining an identification of a signer of the blockchain address information from the blockchain.

14. The method of claim 13, wherein the obtaining the identification of the signer of the blockchain address information from the blockchain comprises obtaining the identification of the signer of the blockchain address information from the blockchain directory.

15. The method of claim 10, wherein the blockchain action comprises submitting a transaction for recordation in the blockchain.

16. The method of claim 10, wherein the method is implemented with a computer, wherein the computer comprises a blockchain node.

17. The method of claim 10, wherein the method is implemented with a computer, wherein the computer comprises a blockchain wallet.

\* \* \* \* \*